US008849272B2

(12) United States Patent
Hsu et al.

(10) Patent No.: US 8,849,272 B2
(45) Date of Patent: Sep. 30, 2014

(54) METHODS FOR COORDINATING RADIO ACTIVITIES IN DIFFERENT RADIO ACCESS TECHNOLOGIES AND APPARATUSES UTILIZING THE SAME

(75) Inventors: Chin-Fa Hsu, Zhubei (TW);
Chun-Sheng Lee, Zhubei (TW);
Wei-Sheng Yin, Jhubei (TW);
Chung-Cheng Yu, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 715 days.

(21) Appl. No.: 12/900,255

(22) Filed: Oct. 7, 2010

(65) Prior Publication Data
US 2011/0207453 A1  Aug. 25, 2011

Related U.S. Application Data

(60) Provisional application No. 61/307,895, filed on Feb. 25, 2010.

(51) Int. Cl.
*H04W 24/00* (2009.01)
*H04W 88/06* (2009.01)
*H04W 24/10* (2009.01)
*H04W 36/00* (2009.01)

(52) U.S. Cl.
CPC .............. *H04W 88/06* (2013.01); *H04W 24/10* (2013.01); *H04W 36/0088* (2013.01)
USPC ..................... 455/425; 455/426.1; 455/426.2; 455/450; 370/328; 370/338

(58) Field of Classification Search
USPC ............. 455/426.1, 426.2, 432.1, 435.1, 436, 455/450, 465, 466, 420, 423, 434, 448, 455/127.4; 370/318, 328–338
See application file for complete search history.

(56) References Cited

U.S. PATENT DOCUMENTS

| 5,872,820 | A * | 2/1999 | Upadrasta | 375/356 |
| 7,047,011 | B1 * | 5/2006 | Wikman | 455/442 |
| 7,924,795 | B2 | 4/2011 | Wan et al. | |
| 8,364,157 | B2 * | 1/2013 | Lee et al. | 455/450 |
| 2003/0218995 | A1 * | 11/2003 | Kim et al. | 370/318 |
| 2005/0208942 | A1 * | 9/2005 | Pekonen et al. | 455/436 |
| 2007/0037594 | A1 * | 2/2007 | Palenius et al. | 455/502 |

(Continued)

FOREIGN PATENT DOCUMENTS

| CN | 101552625 | 10/2009 |
| EP | 1 467 582 | 10/2004 |
| WO | WO 2004/091241 | 10/2004 |

*Primary Examiner* — Quan M Hua
(74) *Attorney, Agent, or Firm* — McClure, Qualey & Rodack, LLP

(57) ABSTRACT

An apparatus for coordinating radio activities in different radio access technologies (RATs) is provided. A first RAT module performs a first channel activity, related to a first RAT, for transmitting or receiving information to or from a first cellular network by using an antenna, and requests that a measurement activity, related to the first RAT, is to be performed for measuring signal power of a serving cell and/or at least one neighbor cell in the first cellular network by using the antenna. A second RAT module requests that a second channel activity, related to a second RAT, is to be performed for transmitting or receiving information to or from a second cellular network by using the antenna. An arbiter schedules performance of the measurement activity between the first and second channel activities.

6 Claims, 40 Drawing Sheets

(56) References Cited

U.S. PATENT DOCUMENTS

| | | |
|---|---|---|
| 2008/0002604 A1 | 1/2008 | Wilborn et al. |
| 2008/0043705 A1* | 2/2008 | Desai et al. ............ 370/346 |
| 2008/0108346 A1* | 5/2008 | Umatt et al. ............ 455/432.1 |
| 2009/0111445 A1* | 4/2009 | Ratasuk et al. ............ 455/418 |
| 2010/0142487 A1* | 6/2010 | Kim ............ 370/332 |
| 2010/0202416 A1* | 8/2010 | Wilhelmsson et al. ....... 370/336 |

* cited by examiner

METHODS FOR COORDINATING RADIO ACTIVITIES IN DIFFERENT RADIO ACCESS TECHNOLOGIES AND APPARATUSES UTILIZING THE SAME

CROSS REFERENCE TO RELATED APPLICATIONS

This application claims the benefit of U.S. Provisional Application No. 61/307,895 filed 2010 Feb. 25 and entitled "Methods for coordinating radio activities requested by different radio access technologies (RAT) modules sharing a single antenna and systems using the same". The entire contents of which are hereby incorporated by reference.

BACKGROUND OF THE INVENTION

1. Field of the Invention

The invention relates to a method for coordinating radio activities in different radio access technologies, and more particularly to a method for coordinating radio activities in different radio access technologies without collisions when a single antenna is used.

2. Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, and video games, to provide a high-frequency wireless local area network.

With the advanced development of wireless communications technologies, it is now possible to provide multiple wireless communications services using different or the same communications technologies in one mobile station (MS). In order to provide efficient and reliable radio services, methods for coordinating radio activities in different radio access technologies is highly required.

BRIEF SUMMARY OF THE INVENTION

Apparatuses and methods for coordinating radio activities in different radio access technologies (RATs) are provided. An embodiment of an apparatus for coordinating radio activities in different radio access technologies (RATs) comprises an antenna, a first RAT module, a second RAT module and an arbiter. The first RAT module performs a first channel activity, related to a first RAT, for transmitting or receiving information to or from a first cellular network by using the antenna, and requests that a measurement activity, related to the first RAT, is to be performed for measuring signal power of a serving cell and/or at least one neighbor cell in the first cellular network by using the antenna. The second RAT module request that a second channel activity, related to a second RAT, is to be performed for transmitting or receiving information to or from a second cellular network by using the antenna. The arbiter schedules performance of the measurement activity between the first and second channel activities.

Another embodiment of an apparatus for coordinating radio activities in different radio access technologies (RATs), comprises an antenna, a first RAT module and a second RAT module. The first and second RAT modules are coupled to the antenna; and the second RAT module performs a measurement activity for a second public land mobile network (PLMN) search between two successive channel activities performed by the first RAT module for a first PLMN search, wherein the first and second RAT modules share the antenna to perform the measurement and channel activities in different time periods.

Another embodiment of an apparatus for coordinating radio activities in different radio access technologies (RATs) comprises an antenna and a first RAT module coupled to the antenna. The first RAT module performs a first measurement activity to scan cells of a first public land mobile network (PLMN) by using the antenna, suspends the first measurement activity when finding that signal strength broadcasted by a first cell of the first PLMN exceeds a threshold, performs at least one first channel activity to camp on the first cell as a serving cell for the first RAT module by using the antenna, and performs a first cell reselection to camp on a second cell of the first PLMN whose signal strength is better than that of the first cell by using the antenna.

Another embodiment of a method for coordinating radio activities in different radio access technologies (RATs) comprises performing, by a first RAT module, a first measurement activity to scan cells of a first partial public land mobile network (PLMN); suspending, by the first RAT module, the first measurement activity when finding that signal strength broadcasted by a first cell of the first PLMN exceeds a threshold; performing, by the first RAT module, at least one first channel activity to camp on the first cell as a serving cell for the first RAT module; and performing, by the first RAT module, a first cell reselection, to camp on a second cell of the first PLMN whose signal strength is better than that of the first cell.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

With mobile stations (MS, which may be interchangeably referred to as user equipments (UE)), now capable of handling different radio access technologies (RAT), such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, and the similar, an MS may locate two or more public land mobile network (PLMN) in different RATs when switched on. The public land mobile network (PLMN) is a wireless communications system intended for use by subscribers, such as an MS.

Figure 1:
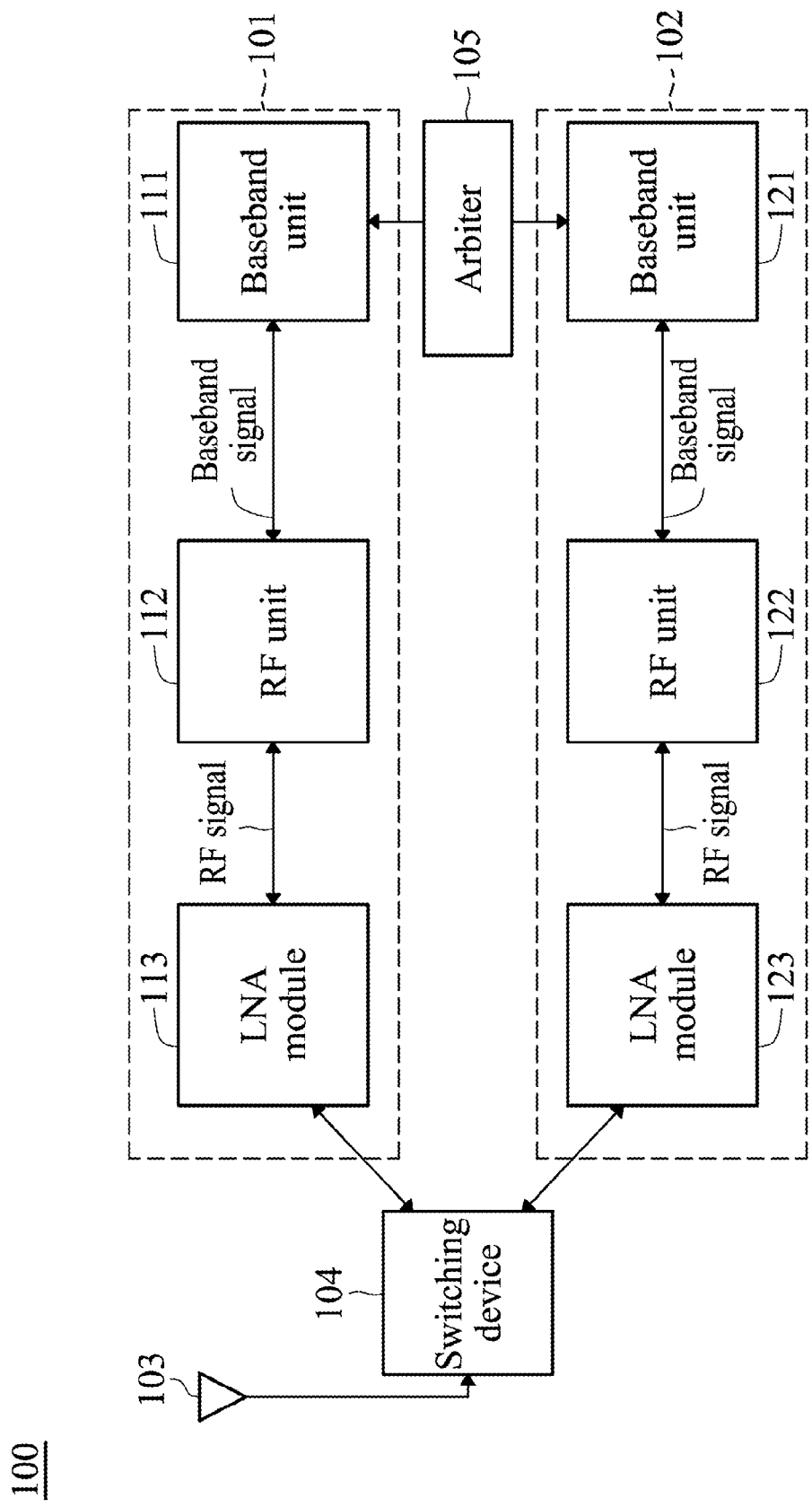
FIG. 1 shows a communications apparatus equipped with two different RAT modules according to an embodiment of the invention.

FIG. 1 shows a communications apparatus equipped with two different RAT modules according to an embodiment of the invention. The communications apparatus 100, which may be an MS, comprises two different RAT modules 101 and 102. Each RAT module having a communications interface conforming to a corresponding wireless communication protocol and transceiving radio frequency (RF) signals in a corresponding cellular network through the antenna may comprise a Baseband unit 111 or 121, a Radio Frequency (RF) unit 112 or 122 and a Low Noise Amplifier (LNA) module 113 or 123. Each of the Baseband units 111 and 121 may comprise a plurality of hardware devices to perform baseband signal processing. The baseband signal processing may comprise analog to digital conversion (ADC)/digital to analog conversion (DAC), gain adjusting, modulation/demodulation, encoding/decoding, and so on. Each of the RF units 112 and 122 may receive radio frequency wireless signals, convert the received signals to baseband signals, which are processed by a corresponding baseband unit, or receive baseband signals from a corresponding baseband unit and convert the received signals to radio frequency wireless signals, which are later transmitted. The RF units may also comprise a plurality of hardware devices to perform radio frequency conversion. For example, the RF units may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on which RAT is being used. Each of the LNA modules 113 and 123 may comprise one or more LNAs for amplifying the RF signals received from the antenna 103 based on the corresponding carrier frequency before being passed to a corresponding RF unit. The antenna 103 is arranged to transmit or receive the RF signals to or from the corresponding cellular network via the air interface for the corresponding RAT module.

According to the embodiments of the invention, the single antenna 103 is shared between different RAT modules 101 and 102. The switching device 104 is coupled between the shared antenna 103 and the LNA modules 113 and 123 and connects the shared antenna 103 to one of the LNA modules 113 and 123 so as to make the RF signals pass through the corresponding LNA to the destined RF unit. Generally, in a PLMN search procedure, the RAT module has to locate a suitable cell, which belongs to the corresponding PLMN of the RAT module, and camp on the suitable cell so as to use the wireless communication services provided by the PLMN. Because the single antenna 103 is shared between different RAT modules 101 and 102, the communications apparatus 100 may further comprise an arbiter 105 to coordinate radio activities requested by the RAT modules 101 and 102. With the coordinated radio activities for multiple RAT modules (such as the RAT modules 101 and 102) equipped in one communications apparatus, efficient and reliable radio services may be provided. Several embodiments of coordinating the radio activities between different RAT modules when sharing a single antenna will be given in the following paragraphs.

Figure 2:
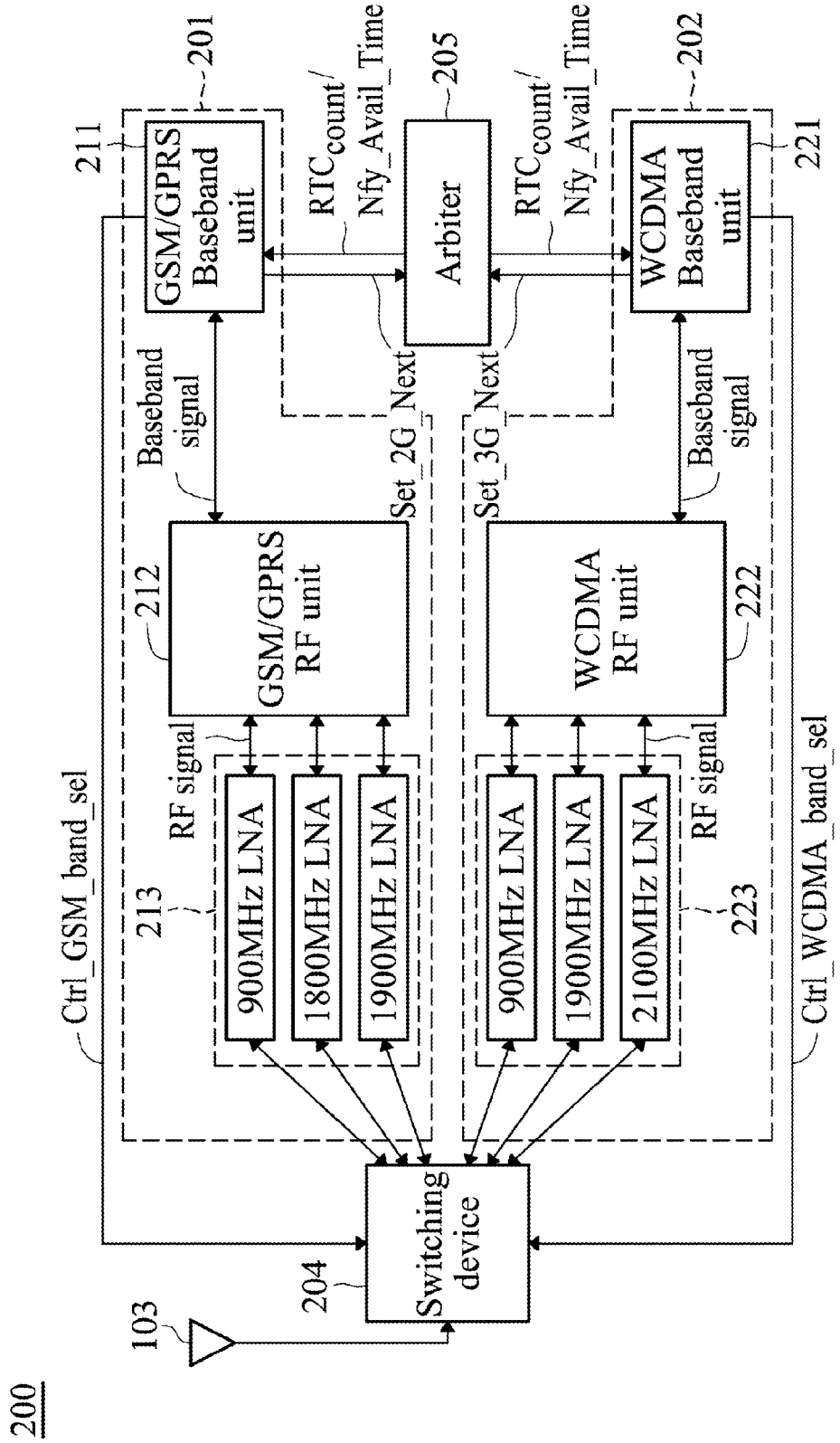
FIG. 2 shows a communications apparatus equipped with two different RAT modules according to an embodiment of the invention.

FIG. 2 shows a communications apparatus 200 equipped with two different RAT modules 201 and 202 according to an embodiment of the invention. Note that in this and the following embodiments, the two RAT modules which are being used may respectively be a GSM/GPRS (also known as the second generation, 2G) and WCDMA (also known as the third generation, 3G) communications system RAT module for illustrative simplicity. However, those skilled in the art will readily appreciate that concepts of the invention can be applied to other RATs and the invention should not be limited thereto. In the embodiment of the invention, the LNA modules 213 and 223 may respectively comprise a plurality of LNAs each being designated for amplifying the RF signals of a corresponding 2G/3G band, where the 2G/3G band may be a 900 MHz, 1800 MHz, 1900 MHz, or 2100 MHz band, or others. The GSM/GPRS RF unit 212 or WCDMA RF unit 222 may measure the received RF signals and report to the GSM/GPRS Baseband unit 211 or WCDMA Baseband unit 221. Once one of the Baseband units attempts to perform a radio activity, such as transmission or reception of channel information, a power scan or frequency scan, a serving cell or neighbor cell measurement activity, or others, the Baseband units may issue a control signal Ctrl_GSM_band_sel or Ctrl_WCDMA_band_sel to direct the switching device 204 to connect the shared antenna to a designated LNA. The arbiter 205 is further arranged to coordinate radio activities requested by the RAT modules 201 and 202. Details of the hardware architecture and operation of the arbiter will be illustrated in the following paragraphs.

Figure 3:
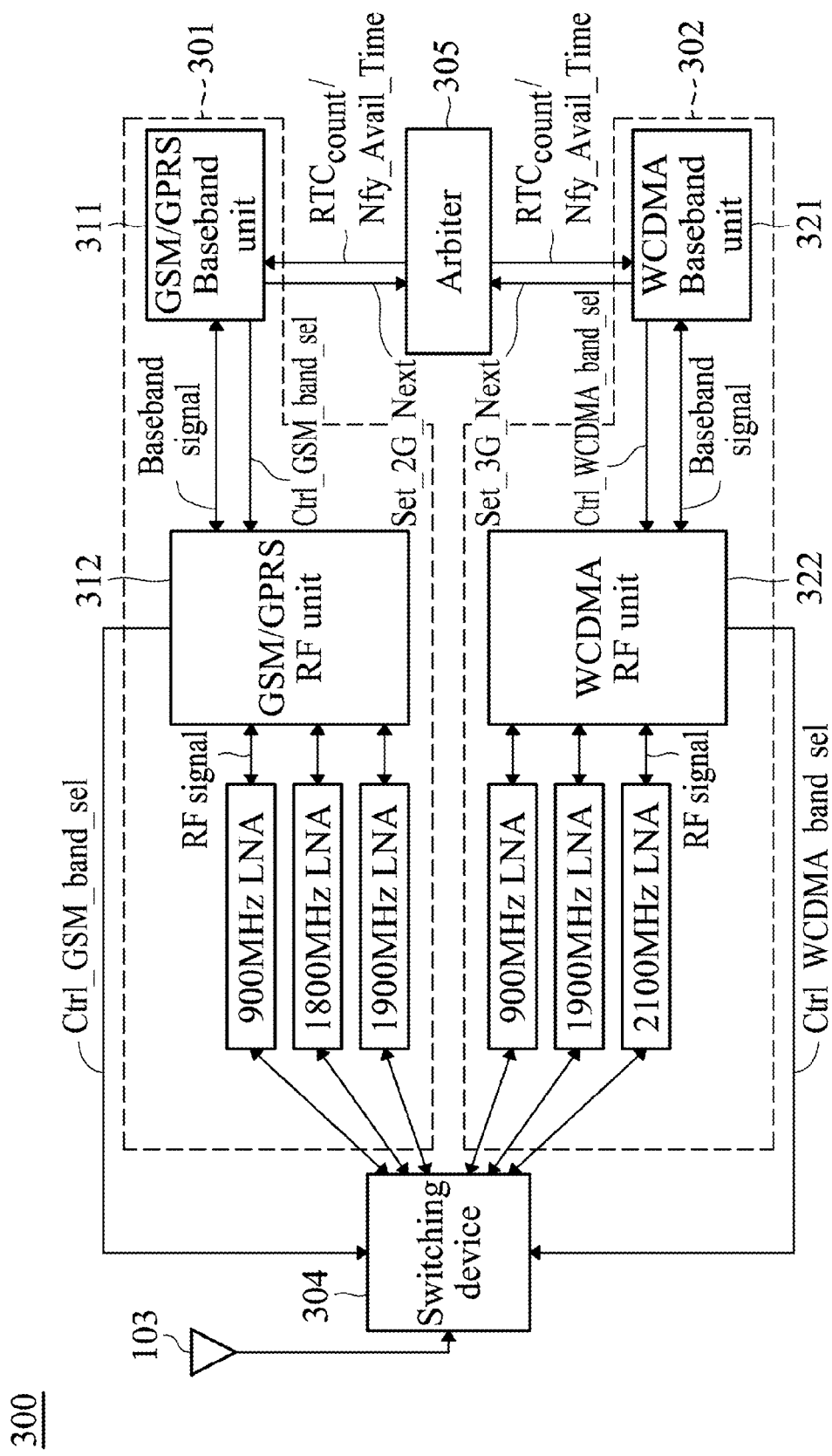
FIG. 3 shows a communications apparatus equipped with two different RAT modules according to another embodiment of the invention.

FIG. 3 shows a communications apparatus 300 equipped with two different RAT modules 301 and 302 according to another embodiment of the invention. Different from the hardware architecture as shown in FIG. 2, the GSM/GPRS Baseband unit 311 or WCDMA Baseband unit 321 issues the control signal to the switching device 304 via the corresponding GSM/GPRS RF unit 312 or WCDMA RF unit 322. Specifically, the GSM/GPRS RF unit 312 or WCDMA RF unit 322 controls the switching device 304 to connect the shared antenna to a designated LNA by using a control signal Ctrl_GSM_band_sel or Ctrl_WCDMA_band_sel from its corresponding GSM/GPRS Baseband unit 311 or WCDMA Baseband unit 321. The arbiter 305 is further arranged to coordinate radio activities requested by the RAT modules 301 and 302. Details of the hardware architecture and operation of the arbiter will be illustrated in the following paragraphs.

Figure 4:
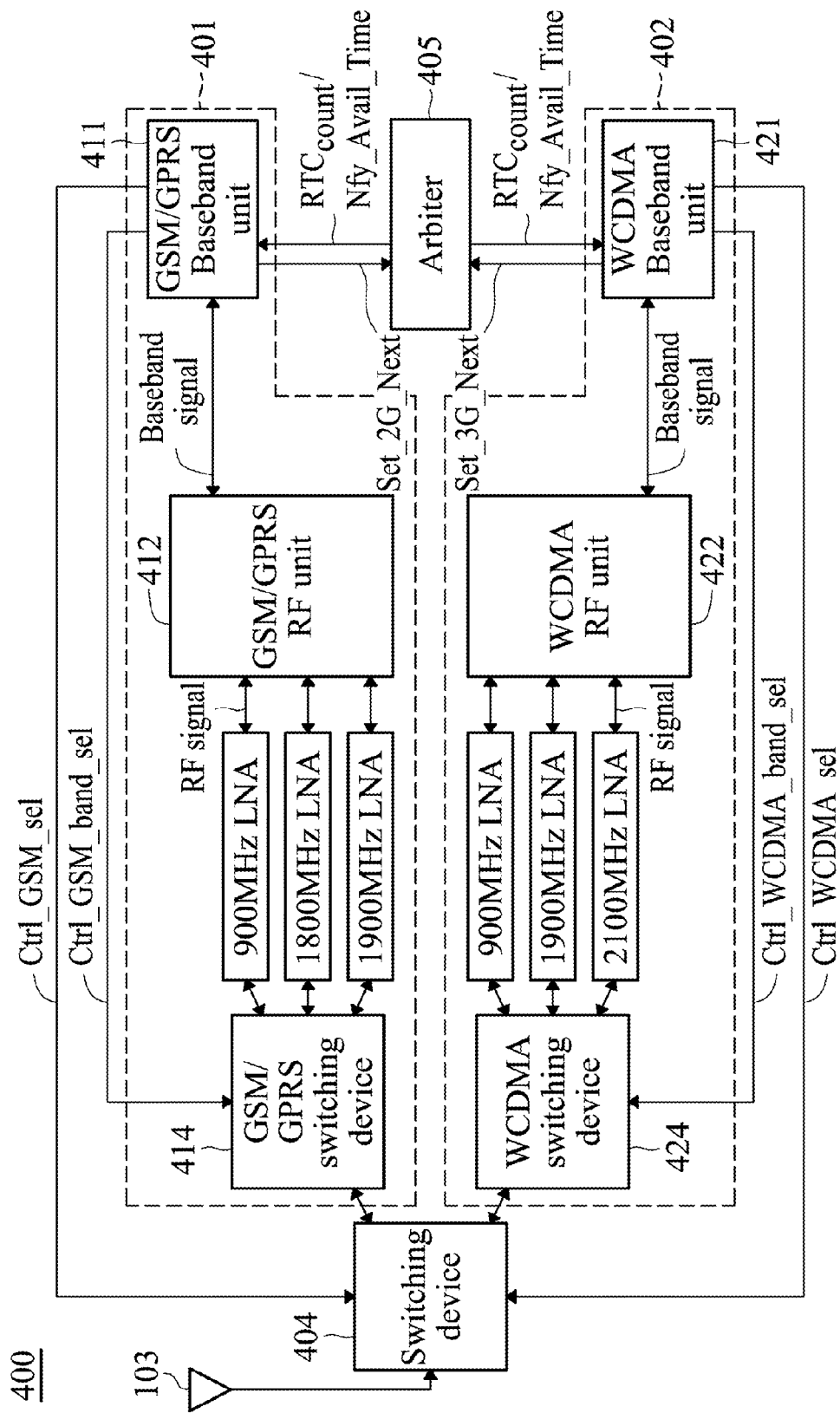
FIG. 4 shows a communications apparatus equipped with two different RAT modules according to still another embodiment of the invention.

FIG. 4 shows a communications apparatus 400 equipped with two different RAT modules 401 and 402 according to still another embodiment of the invention. The one-layer switching architecture as shown in FIG. 1 to FIG. 3 may be modified to a two-layer switching architecture. A first-layer switching device 404 is coupled between the shared antenna and second-layer switching devices to connect the antenna to one of the second-layer switching devices, such as the GSM/GPRS switching device 414 and WCDMA switching device 424. The GSM/GPRS switching device 414 is coupled between the first-layer switching device and multiple GSM band LNA to connect the first-layer switching device 404 to one designated GSM band LNA. Similarly, the WCDMA switching device 424 is disposed to connect the first-layer switching device 404 to one designated WCDMA band LNA. Once the baseband unit 411 or 421 attempts to perform a radio activity, it issues a control signal Ctrl_GSM_sel or Ctrl_WCDMA_sel to direct the first-layer switching device 404 to connect the shared antenna to one of the GSM and WCDMA switching devices 414 and 424, as well as, issues a control signal Ctrl_GSM_band_sel or Ctrl_WCDMA_band_sel to the corresponding switching device to connect to a designated LNA. The arbiter 405 is further arranged to coordinate radio activities requested by the RAT modules 401 and 402. Details of the hardware architecture and operation of the arbiter will be illustrated in the following paragraphs.

Figure 5:
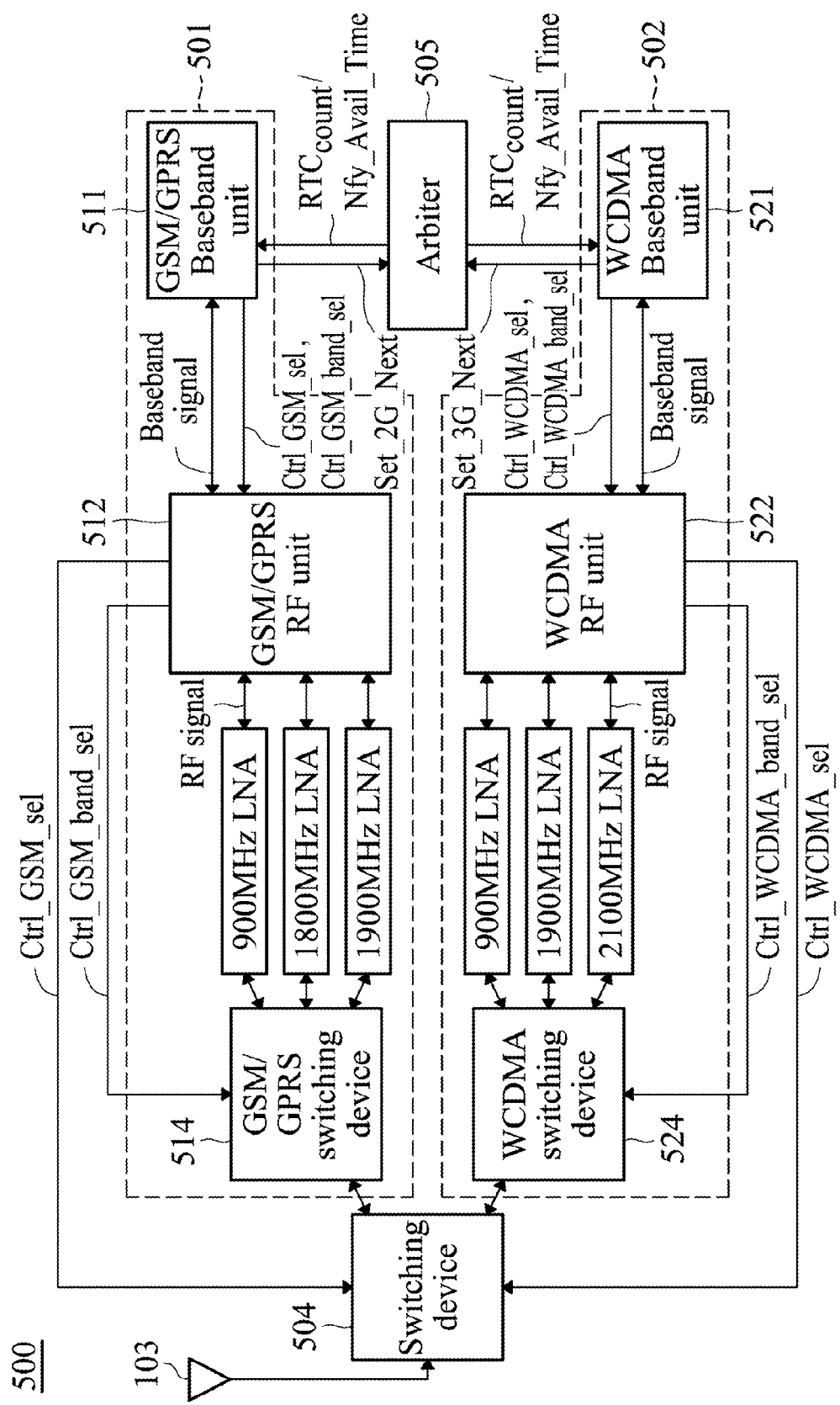
FIG. 5 shows a communications apparatus equipped with two different RAT modules according to still another embodiment of the invention.

FIG. 5 shows a communications apparatus 500 equipped with two different RAT modules 501 and 502 according to still another embodiment of the invention. Different from the hardware architecture as shown in FIG. 4, the GSM/GPRS baseband unit 511 and WCDMA baseband unit 521 issue the corresponding control signals Ctrl_GSM_sel/Ctrl_WCDMA_sel and Ctrl_GSM_band_sel/Ctrl_WCDMA_band_sel to the GSM and WCDMA switching devices 504, 514 and 524 via respective corresponding RF units 512 and 522. Specifically, an RF unit controls the switching devices 504, 514 and 524 to connect the shared antenna to a designated LNA in turn according to control signals Ctrl_GSM_sel/Ctrl_WCDMA_sel and Ctrl_GSM_band_sel/Ctrl_WCDMA_band_sel from its corresponding baseband unit 511 or 521. The arbiter 505 is further arranged to coordinate radio activities requested by the RAT modules 501 and 502. Details of the hardware architecture and operation of the arbiter will be illustrated in the following paragraphs.

Figure 6:
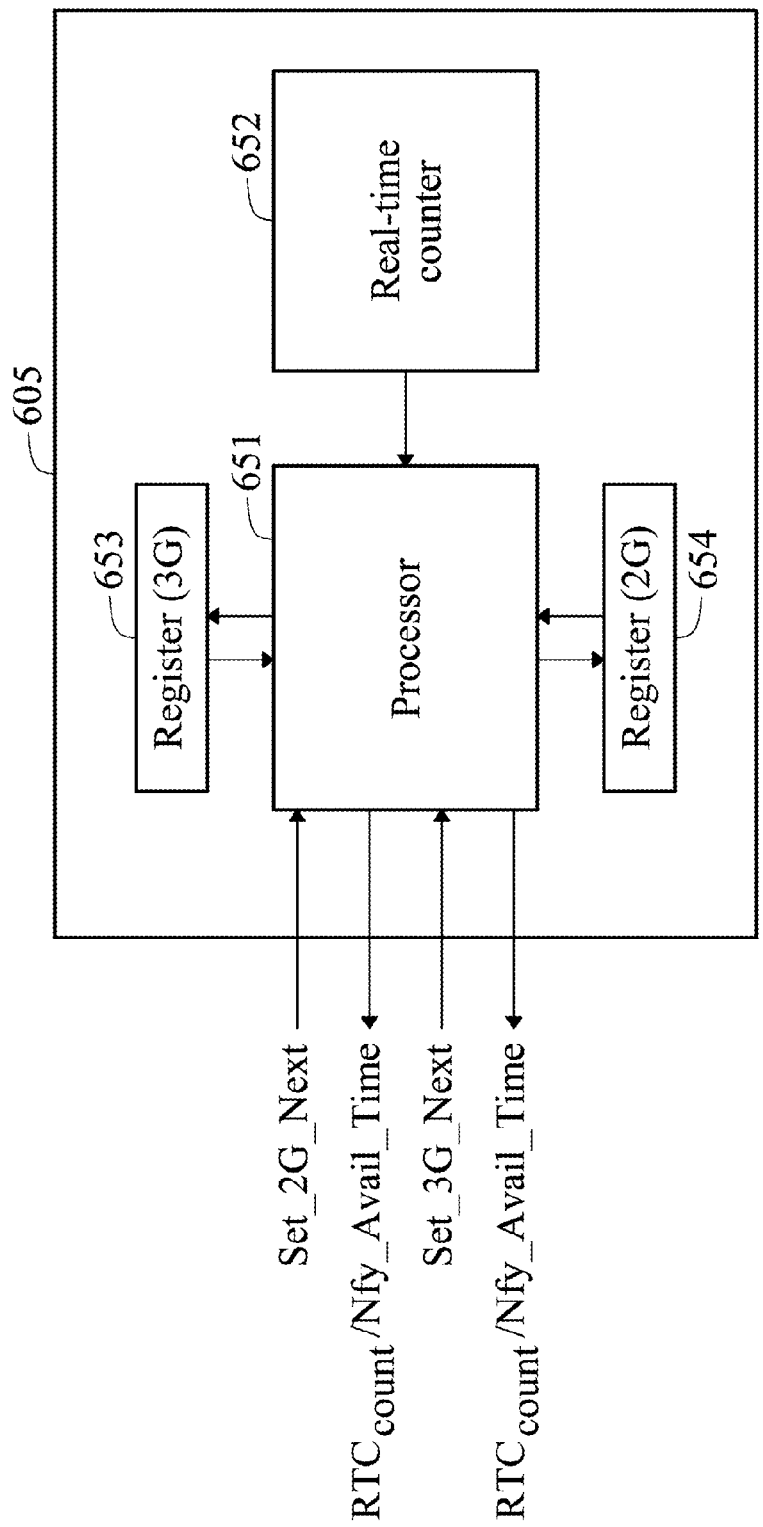
FIG. 6 shows a block diagram of an arbiter according to an embodiment of the invention.
Figure 7:
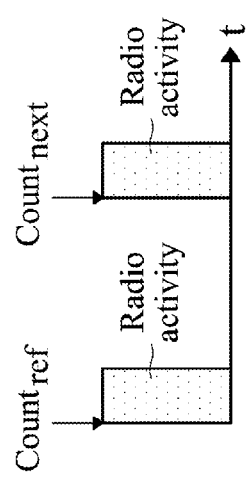
FIG. 7 is a timing diagram showing the start time of a current radio activity and a forthcoming radio activity.

FIG. 6 shows a block diagram of an arbiter according to an embodiment of the invention. According to an aspect of the invention, the arbiter 605 is implemented to facilitate scheduling of radio activities in a coordinated manner for different RAT modules. A real-time counter (RTC) 652 installed in the arbiter 605 comprises a free running clock with a specific frequency, such as 3.25 Mhz when enabled. Those skilled in the art may understand that the 3.25 Mhz is configured to support a ⅓ quarter bit (qbit) resolution (where 1 qbit=12/13 μs, therefore, ⅓ qbit=4/13 μs). A real time base (RTB) software module, when executed by a processor 651 of the arbiter 605, provides an interface to interact with the Baseband units of different RAT modules, such as the GSM/GPRS Baseband unit and WCDMA Baseband unit as illustrated above. The RTB software module may provide the current count value $RTC_{count}$ to the RAT modules as a reference count (e.g. $Count_{ref}$ as shown in FIG. 7). Note that the arbiter may also be integrated into either of the RAT modules and the invention should not be limited thereto. [0059] According to the embodiments of the invention, each time a RAT module plans to perform a radio activity, such as a transmission (Tx) or a reception (Rx) channel operation, the start time of a next channel activity is also reported to the arbiter 605 by issuing a timing set command, such as the Set_2G_Next or Set_3G_Next shown in FIG. 6. It is to be understood that the Baseband units or the arbiter may convert the time of the forthcoming channel activity into counts based on a previously received reference count. The reported start time may be represented by an absolute count value (e.g. $Count_{next}$ as shown in FIG. 7), which is determined with reference to the received reference count (e.g. $Count_{ref}$ as shown in FIG. 7). For example, the GSM/GPRS or WCDMA Baseband unit, or the arbiter may convert the 2G or 3G frame length to the next channel activity into counts based on a previously received reference count. According to an embodiment of the invention, when one of the RAT modules is a WCDMA (3G) module, and when a 3.25 Mhz RTC is running in the arbiter 605, the absolute count value for the start time of a forthcoming (i.e. a next) 3G radio activity may be calculated by the following equation, $$Count_{next}=Count_{ref}+(X\text{-}RTB\_SYNC\_WTIME\_FN)*32500+(Y\text{-}RTB\_SYNC\_WTIME\_ECHIPS)*325/3072, \quad \text{Eq. (1)}$$

where X represents a specific frame number of a WCDMA frame, in which the next radio activity is performed, RTB_SYNC_WTIME_FN represents a specific frame number of a WCDMA frame, in which the sync timing procedure is performed, Y represents an offset from the beginning of the (X)-th WCDMA frame to the start time of the next radio activity, and RTB_SYNC_WTIME_ECHIPS represents an offset from the beginning of the (RTB_SYNC_WTIME_FN)-th WCDMA frame to the time performing the sync timing procedure SYNC_TIME_WCDMA. According to the embodiments of the invention, the above-mentioned sync timing procedure may be periodically performed. In a sync timing procedure, the arbiter 605 may read the current count value of the RTC 652, and the RTB software module may directly provide (or with some mathematic transformation on) the currently read count value $RTC_{count}$ of the RTC 652 as the reference count (e.g. $Count_{ref}$ as shown in FIG. 7). Note that the one of ordinary skill in the art will readily appreciate that the above-mentioned sync timing procedure may also be usually (that is, no need to be periodically) performed, and the invention should not be limited thereto.

Figure 9:
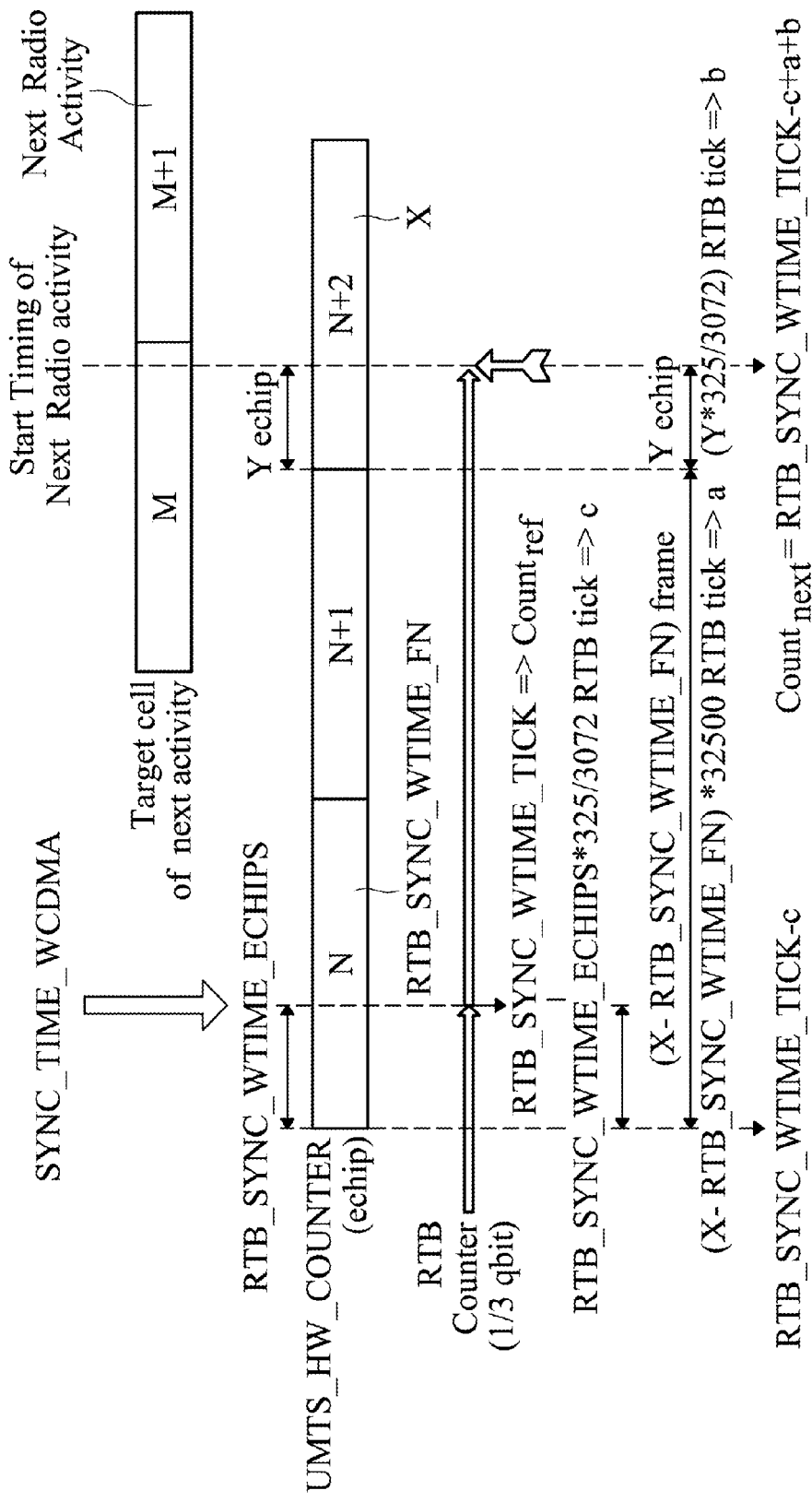
FIG. 9 is a timing diagram showing the mapping relationship between a WCDMA counter and a common RTB counter.

FIG. 9 is a timing diagram showing the mapping relationship between a WCDMA counter and a common RTB counter. The UMTS_HW_COUNTER with echip resolution (echip=1/8 chip=1/30.72 μs) is the WCDMA counter maintained by the WCDMA module to provide a system clock for the WCDMA module, where the system clock is synchronized with the WCDMA cellular network for transceiving information therebetween. According to the embodiment of the invention, the RTB counter with a ⅓ quarter bit (qbit) resolution (=4/13 μs) is not necessarily to be finer than that of the WCDMA system clock, and may still be provided as a common counter maintained by the processor 651 of the arbiter 605 to coordinate the timing between different RAT modules (for example, WCDMA and GSM/GPRS modules in this embodiment). As shown in FIG. 9, RTB_SYNC_WTIME_TICK represents the current count value $Count_{ref}$ of the RTB counter read in the current sync timing procedure performed at the time as indicated by SYNC_TIME_WCDMA, X is the frame number of a WCDMA frame in which the next radio activity is performed, and RTB_SYNC_WTIME_FN is the frame number of a WCDMA frame in which the sync timing procedure is performed. Y is an offset from the beginning of the (X)-th WCDMA frame to the start time of the next radio activity, and is further converted from the time scale of the UMTS_HW_COUNTER to the time scale of the RTB counter as (Y*325/3072) RTB tick (represented by the parameter 'b' for simplicity) so as to represent the corresponding count value of the RTB counter. RTB_SYNC_WTIME_ECHIPS is an offset from the beginning of the (RTB_SYNC_WTIME_FN)-th WCDMA frame to time of performing the sync timing procedure SYNC_TIME_WCDMA, and is further converted from the time scale of the UMTS_HW_COUNTER to the time scale of the RTB counter as (RTB_SYNC_WTIME_ECHIPS*325/3072) RTB tick (represented by the parameter 'c' for simplicity) so as to represent the corresponding count value of the RTB counter. (X-RTB_SYNC_WTIME_FN) is the difference of frame numbers between the forthcoming WCDMA frame which has a next radio activity and the WCDMA frame in which the current sync timing procedure is performed, and is further converted to the time scale of the RTB counter as (X-RTB_SYNC_WTIME_FN)*32500 RTB tick (represented by the parameter 'a' for simplicity) so as to represent the corresponding count value of the RTB counter. Finally, the count value $Count_{next}$ of the next WCDMA radio activity represented in the time scale of the RTB counter is obtained by computing (RTB_SYNC_GTIME_TICK−c+a+b) as given in Eq. (1). According to the embodiment of the invention, since the sync timing procedure may be regularly or usually performed so as to refresh the reference count read from the RTC 652, the rounding error when performing the timing base conversion, as shown in Eq. (1) or Eq. (2), may not be unlimitedly accumulated to cause the conversion error.

According to another embodiment of the invention, when one of the RAT modules is a GSM/GPRS (2G) module, and when a 3.25 Mhz RTC is running in the arbiter 605, the absolute count value for a 2G radio activity may be calculated by the following equation, $$Count_{next} = Count_{ref} + (X\text{-RTB\_SYNC\_GTIME\_FN})*15000 + (Y\text{-RTB\_SYNC\_GTIME\_EBITS})*3/2, \quad \text{Eq. (2)}$$

where X represents a specific frame number of a GSM frame, in which the next radio activity is performed, RTB_SYNC_GTIME_FN represents a specific frame number of a GSM frame, in which the sync timing procedure is performed, Y represents an offset from the beginning of the (X)-th GSM frame to the start time of the next radio activity, and RTB_SYNC_GTIME_EBITS represents an offset from the beginning of the (RTB_SYNC_GTIME_FN)-th GSM frame to the time of performing the sync timing procedure SYNC_TIME_GSM.

Figure 10:
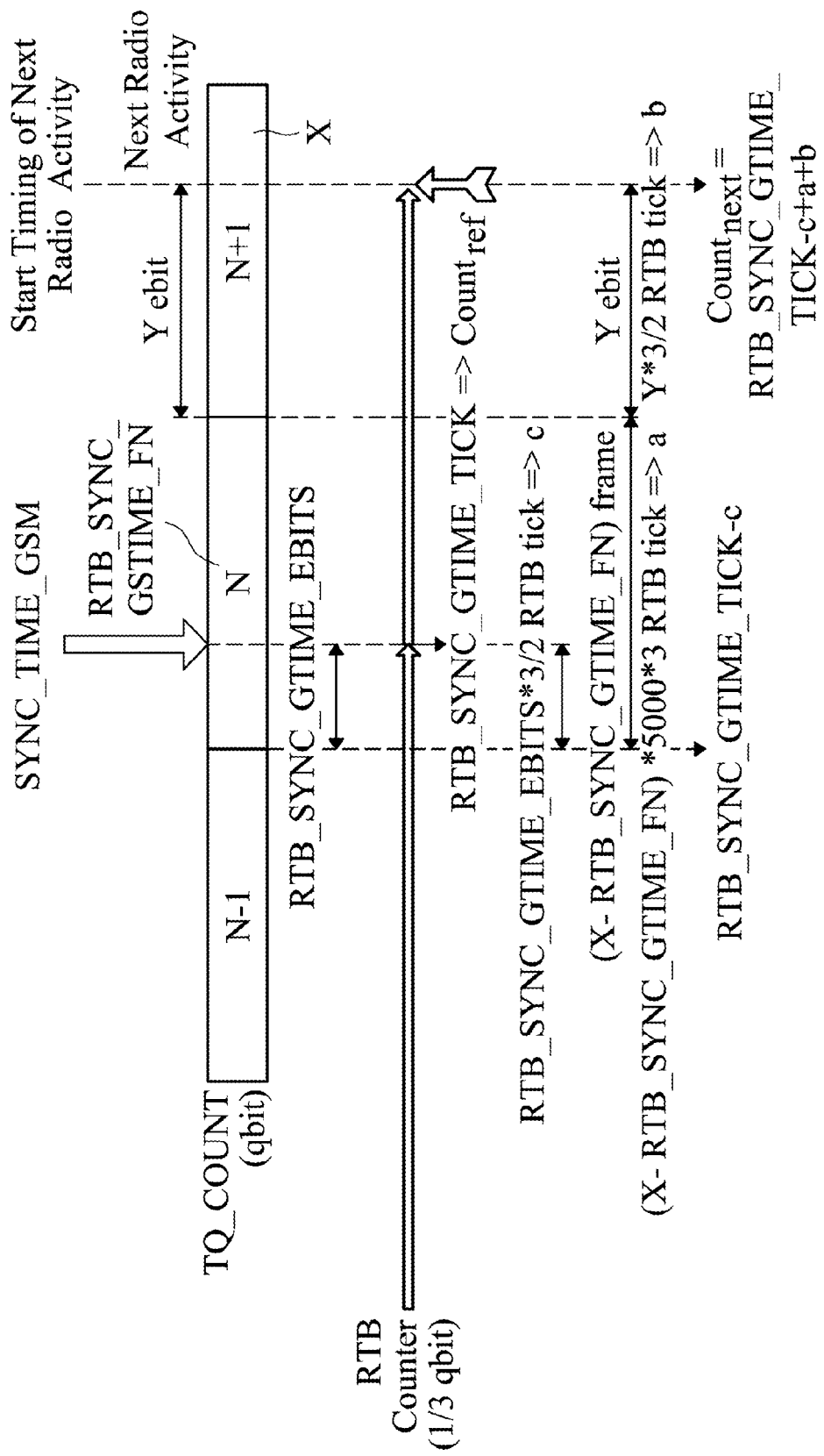
FIG. 10 is a timing diagram showing the mapping relationship between a GSM/GPRS counter and a common RTB counter.

FIG. 10 is a timing diagram showing the mapping relationship between a GSM/GPRS counter and a common RTB counter. The TQ_COUNT with quarter bit (qbit) resolution is the GSM/GPRS counter maintained by the GSM/GPRS module to provide a system clock for the GSM/GPRS module, where the system clock is synchronized with the GSM/GPRS cellular network for transceiving information therebetween. The RTB counter with a ⅓ quarter bit resolution that is finer than that of the GSM/GPRS system clock is a common counter maintained by the processor 651 of the arbiter 605 to coordinate the timing between different RAT modules (for example, WCDMA and GSM/GPRS modules in this embodiment). As shown in FIG. 10, RTB_SYNC_GTIME_TICK represents the current count value $Count_{ref}$ of the RTB counter read in the current sync timing procedure performed at the time SYNC_TIME_GSM, X is the frame number of a GSM frame in which the next radio activity is performed, and RTB_SYNC_GTIME_FN is the frame number of a GSM frame in which the sync timing procedure is performed. Y is an offset from the beginning of the (X)-th GSM frame to the start time of the next radio activity, and is further converted from the time scale of the TQ_COUNT counter to the time scale of the RTB counter as (Y*3/2) RTB tick (represented by the parameter 'b' for simplicity) so as to represent the corresponding count value of the RTB counter. RTB_SYNC_GTIME_EBITS is an offset from the beginning of the (RTB_SYNC_GTIME_FN)-th GSM frame to the time of performing the sync timing procedure SYNC_TIME_GSM, and is further converted from the time scale of the TQ_COUNT counter to the time scale of the RTB counter as (RTB_SYNC_GTIME_EBITS*3/2) RTB tick (represented by the parameter 'c' for simplicity) so as to represent the corresponding count value of the RTB counter. (X-RTB_SYNC_GTIME_FN) is the difference of frame numbers between the forthcoming GSM frame which has a next radio activity and the GSM frame in which the current sync timing procedure is performed, and is further converted to the time scale of the RTB counter as ((X-RTB_SYNC_GTIME_FN)*5000*3) RTB tick (represented by the parameter 'a' for simplicity) so as to represent the corresponding count value of the RTB counter. Finally, the count value $Count_{next}$ of the next GSM radio activity represented in the time scale of the RTB counter is obtained by computing (RTB_SYNC_GTIME_TICK−c+a+b) as given in Eq. (2).

In the embodiments of the invention, the RTB software module receives and stores the reported start time $Count_{next}$ in a corresponding register, such as a 2G register 654 or 3G register 653, to indicate the start time for a forthcoming 2G or 3G radio activity. It is to be understood that the reported start time $Count_{next}$ may be alternatively stored in a specific address of a memory and the invention should not be limited thereto.

Figure 8:
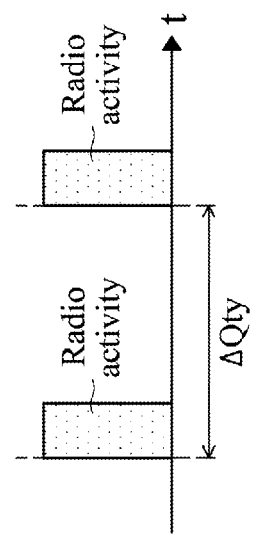
FIG. 8 is a timing diagram showing the time difference between a current radio activity and a forthcoming radio activity.

According to another embodiment of the invention, the reported start time may alternatively be represented by incremental counts up to the beginning of the forthcoming channel activity, denoted as Δ Qty, as shown in FIG. 8. The RTB software module receives and adds the reported count value Δ Qty to the current count value, and stores the computation result in a corresponding register, such as the 2G register 654 or 3G register 653, or a specific address of a memory, to indicate the start time for a forthcoming 2G or 3G radio activity. In some embodiments, the GSM/GPRS or WCDMA Baseband unit may alternatively issue a timing set command Set_2G_Next or Set_3G_Next carrying parameters of X, Y, RTB_SYNC_GTIME_FN or RTB_SYNC_WTIME_FN and RTB_SYNC_GTIME_EBITS or RTB_SYNC_WTIME_EBITS to the arbiter, without the RTC value synchronization therebetween as discussed above. Once receiving the timing set command, the RTB software module obtains the current time value $RTC_{count}$, accordingly calculates the absolute count value $Count_{next}$ for a 2G or a 3G channel activity, and stores the computation result in a corresponding register or a specific address of a memory.

In the embodiments of the invention, radio activities are generally represented as the activities of transceiving RF signals by using the antenna via the air interface. According to an embodiment of the invention, the radio activities performed by different RAT modules may further be grouped in two types, one is a channel activity type and the other is a measurement activity type. The channel activities may refer to the activities for transmitting information to or receiving information from the cellular network. Since the cellular network often transmits or receives the information at a specific time according to the channel configuration, the channel activities may generally have to be performed at the specific time synchronized with the cellular network, or otherwise information loss may happen. For example, the radio activities of listening to the system information block (SIB) channel in the WCDMA system, listening to the frequency correction channel (FCCH) in the GSM system, or the likes may be regarded as one of the channel activities. On the contrary, the measurement activities may refer to the activities that do not have to be performed at specific time. In other words, the measurement activities may be performed any time when the RAT module determines that it is required. For example, the radio activities of power scan, frequency scan, measuring signal power of the serving cell, measuring signal power of the neighbor cell, or the likes may be regarded as one of the measurement activities. In the following paragraphs, several embodiments of coordinating the radio activities, including the channel activities and measuring activities, between different RAT modules based on the above-mentioned hardware architectures and common timing base (e.g. the RTB counter) when sharing a single antenna will be discussed in detail.

In the embodiments of the invention, the arbiter (such as the arbiter 105, 205, 305, 405, 505 or 605) may coordinate the radio activities requested by different RAT modules by using a clock (e.g. the RTB counter as previously described) with a resolution which is not necessary to be finer than that of the clocks individually used in the corresponding RAT modules as a common timing base. The arbiter or the corresponding RAT modules may convert time for the radio activities to take place onto the time scale of the common clock, as the examples show in FIG. 9 and FIG. 10. According to an embodiment of the invention, when a RAT module transmits a request for using the shared antenna to perform a current radio activity, the request may carry information regarding timings of the current radio activity and a forthcoming radio activity. As previously described, the timing information may be represented by using the time scale of the clock utilized by the requesting RAT module, or the requesting RAT module may convert the timing onto the time scale of the common clock before transmitting the timing information to the arbiter, and the invention should not be limited thereto. In the embodiments of the invention, the timing information carried in the request may comprise the duration of the current radio activity and start time of the forthcoming radio activity. Upon receiving the request, the arbiter may estimate available time interval between the two successive radio activities requested by the same RAT module, and schedule at least one radio activity of a counterpart RAT module (different from the RAT module requesting the current radio activity) between the two successive radio activities when duration of a forthcoming radio activity of the counterpart RAT module fits in the available time interval. Specifically, the arbiter may interlace schedules for using the antenna of a plurality of first radio activities requested by a first RAT module and a plurality of second radio activities requested by a second RAT module so as to coordinate the radio activities in different RATs without collision.

According to an embodiment of the invention, after a radio activity has been completed, a corresponding Baseband unit may tick the RTB software module or transmit an indication signal to the RTB software to inform of its completion. When being ticked or receiving the indication signal, the RTB software module may calculate the above-mentioned available time interval, as the $TI_{available}$ shown in FIG. 11, to obtain the available time till the forthcoming radio activity that will be performed by the ticking Baseband unit, and notify the counterpart Baseband unit with a message Nfy_Avail_Time as shown in FIG. 2 to FIG. 6 containing the calculated available time interval in RTC counts. The notified Baseband unit may direct its corresponding RF unit to arrange radio activities during the available time interval $TI_{available}$.

According to the concept of the invention, embodiments of the method for coordinating the radio activities between different RAT modules may be substantially classified into several groups based on different circumstance. The first group of embodiments of coordinating the radio activities between different RAT modules when performing a PLMN search after a power on procedure of the communications apparatus will be introduced. First, basic events of the WCDMA PLMN search that occur after powering up of the MS are described in the following paragraphs. Note that such basic events may alternatively occur during a manual PLMN search triggered by a user. When beginning a WCDMA PLMN search procedure, the WCDMA Baseband unit may instruct the WCDMA RF unit to perform a power scan operation to locate one or more potential cells with better signal qualities to camp on. The better signal quality means the signal strength exceeds a threshold. The WCDMA Baseband unit may conduct a full power scan for all possible RF channels, or scan designated RF channels recorded in a cell list, which is indicated and stored in a memory or a storage device, or scan a particular WCDMA band. Based on the results of the power scan, a cell search procedure may be performed for the cell with the best signal quality, containing steps of slot synchronization, frame synchronization and code-group identification, and scrambling-code identification. For slot synchronization, the MS uses the primary synchronization code of synchronization Channel (SCH) to achieve slot synchronization with the cell. The slot synchronization may be achieved with a single matched filter (or any similar device) that matches with the primary synchronization code which is common to all cells. The slot timing of the cell can be obtained by detecting peaks in the matched filter output. During the frame synchronization and code-group identification procedure, the MS employs the secondary synchronization code of SCH to locate frame synchronization between the MS and the cell and identify the code group of the cell found in the previous step. The frame synchronization may be achieved by correlating the received signal with all possible secondary synchronization code sequences, and identifying the maximum correlation value. Since the cyclic shifts of the sequences are unique, the code group and the frame synchronization can be determined. During the scrambling-code identification procedure, the MS determines the exact primary scrambling code used by the cell. The primary scrambling code is typically identified through symbol-by-symbol correlation over the common pilot channel (CPICH) with all codes within the code group identified in the previous step. After the primary scrambling code is identified, the primary common control physical channel (CCPCH) may be detected and the cell-specific broadcast channel (BCH) information may be read.

After completion of the power scan operation and the cell search operation procedure, the WCDMA Baseband unit may direct the WCDMA RF unit to listen to a system frame number (SFN) channel so as to identify the framing and timing of a cell on a node-B. Thereafter, one or more system information block (SIB) channels are listened to. The system information elements are broadcast in system information blocks. A system information block groups system information elements of the same nature together. Different system information blocks may have different characteristics, such as characteristics regarding the blocks repetition rate and the requirements of the MS to read the System Information. After completely collecting and storing the System Information of the cell in memory or a storage device, the WCDMA module performs a location update procedure through a dedicated channel (DCH) to inform the cellular network of its location, and camps on the cell as a serving cell. The WCDMA PLMN search has been completed once the MS reports its location to the cellular network.

In another aspect, basic events of the GSM PLMN search are described below. After power is turned on or triggered by a user, the MS starts to perform a power scan operation to locate proper cells to camp on. During the power scan, the GSM/GPRS Baseband unit may instruct the GSM/GPRS RF unit to perform signal level measurements on frequencies of the cells in a stored cell list of the current network. Alternatively, if no list is available, all GSM frequencies, or frequencies of a GSM band have to be measured to locate potential broadcast control channels (BCCH). After finding potential candidates based on the received signal level RXLREV (that is, completion of the power scan), each carrier is investigated by the GSM/GPRS Baseband unit for the presence of a frequency correction channel (FCCH), beginning with the strongest signal. A FCCH burst (FCB) is an all-zero sequence that produces a fixed tone enabling the GSM/GPRS RF unit to lock its local oscillator to the base station (BS) clock. Its presence identifies the carrier as a BCCH carrier for synchronization. The MS then uses a synchronization burst (SB) of the synchronization channel (SCH) following the FCCH burst which has a long training sequence to fine tune the frequency correction and time synchronization. The GSM/GPRS Baseband unit obtains and stores the exact channel configuration of the selected cell from the BCCH data as well as the frequencies of the neighboring cells. After completely collecting and storing information regarding the exact channel configuration of the selected cell and neighboring cells in a memory or a storage device, the GSM/GPRS module performs a location update procedure through a traffic channel (TCH) to inform the cellular network of its location, and camp on the selected cell as the serving cell. The GSM PLMN search has been completed once the MS reports its location to the cellular network.

According to the embodiments of the invention, the arbiter (such as the arbiter 105, 205, 305, 405, 505 or 605) may coordinate the radio activities requested by different RAT modules (such as the GSM/GPRS module 201, 301, 401 or 501 and the WCDMA module 202, 302, 402 or 502) for performing the corresponding PLMN search (such as the GSM/GPRS PLMN search and WCDMA PLMN search) after a power on operation of the communications apparatus (such as the communications apparatus 100, 200, 300, 400 or 500) as previously described by multiplexing the individual radio activities before one of the RAT modules camps on a suitable cell. For example, the arbiter may coordinate the radio activities by interlacing schedules for the RAT modules to use the shared antenna 103 for a corresponding PLMN search. To be more specific, the arbiter may coordinate the radio activities in a multiplexing manner by scheduling at least one of the GSM/GPRS or WCDMA radio activities between two successive WCDMA or GSM/GPRS radio activities until one of the GSM/GPRS and WCDMA modules camps on the suitable cell. As previously described, the radio activities may be either the measurement activities for scanning signal power of a plurality of cells or the channel activities for transmitting or receiving information to or from a cell.

Take a WCDMA PLMN search as an example, during the entire WCDMA PLMN search, one or more unoccupied time slots may be utilized to perform a power scan operation for the GSM/GPRS module to accelerate the GSM/GPRS PLMN search. During the GSM/GPRS power scan operation, all GSM frequencies may be measured to find potential broadcast control channel (BCCH) carriers. When the communications apparatus has a stored list of carriers, in another way, the GSM/GPRS Baseband unit may direct the GSM/GPRS RF unit to measure the corresponding frequencies. In still another way, the communications apparatus may merely scan several designated frequencies or a GSM band.

Figure 11:
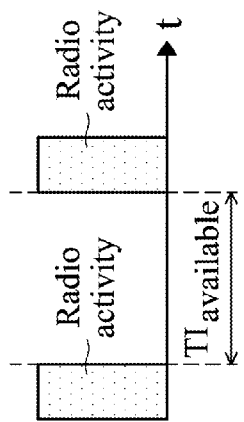
FIG. 11 is a timing diagram showing the available time interval between two radio activities.
Figure 13:
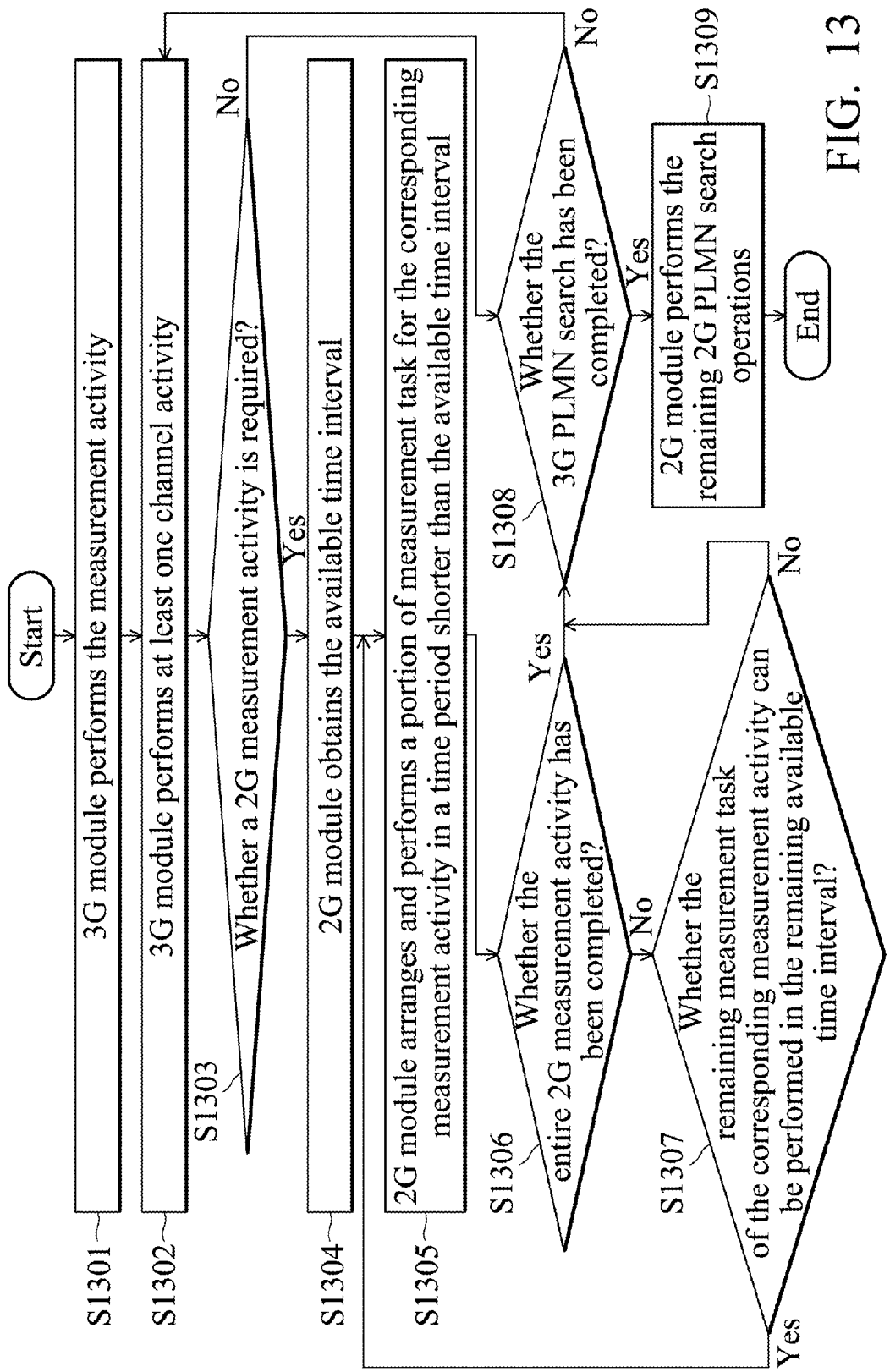
FIG. 13 is a flow chart showing a method for supporting the PLMN searches in different RATs with coordinated radio activities by using a shared antenna according to an embodiment of the invention.
Figure 14:
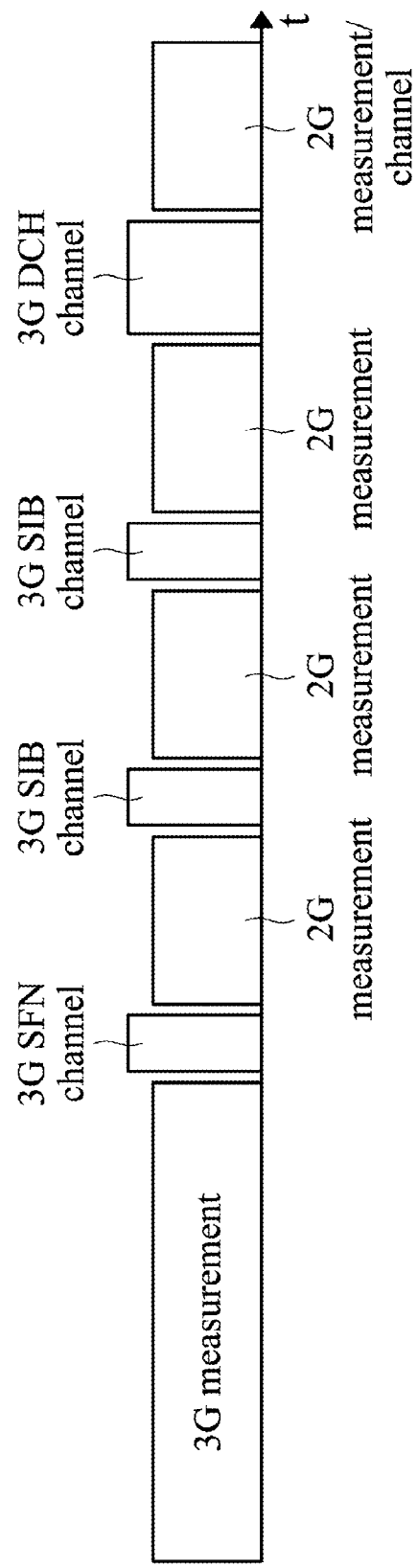
FIG. 14 is a timing diagram showing the coordinated radio activities of the PLMN searches in different RATs according to an embodiment of the invention.

FIG. 13 is a flow chart showing a method for supporting the PLMN search in different RATs with coordinated radio activities by using a shared antenna according to an embodiment of the invention. In this embodiment, the WCDMA (hereinafter called the 3G for simplicity) PLMN search is initiated earlier than that of GSM/GPRS (hereinafter called the 2G) module. The process begins with performing the 3G measurement activity (step S1301), which may include at least the power scan operation and the cell search operation as previously described. After the 3G measurement activity has been completed, the 3G module may further perform at least a channel activity as shown in FIG. 14 (Step S1302). Next, a loop may be repeatedly executed to check whether a 2G measurement activity can be performed up until the beginning of a forthcoming 3G channel activity, wherein the 3G channel activity may be listening to a SFN or SIB channel, or a location update via the DCH channel as mentioned above. At the beginning of each turn, the 3G module may notify the arbiter when completing its channel activity. According to the embodiment of the invention, the 2G module or arbiter may first determine whether a 2G measurement activity is required (Step S1303). When a 2G measurement activity is required, the arbiter may estimate the available time interval $TI_{available}$ as shown in FIG. 11 up until the beginning of a forthcoming 3G channel activity, and notify the 2G module via a message Nfy_Avail_Time containing the estimated available time interval as previously described. After obtaining the available time interval (Step S1304), the 2G module may arrange and perform a portion of a measurement task for the corresponding measurement activity in a time period which is shorter than the available time interval (Step S1305).

Figure 12:
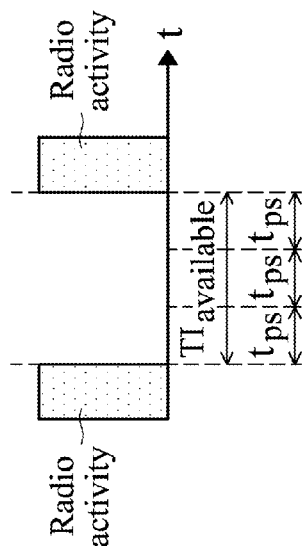
FIG. 12 is a timing diagram showing the concept of dividing the available time interval into several shorter time intervals according to an embodiment of the invention.

Note that according to an embodiment of the invention, the 2G module may perform the corresponding measurement activity stepwise in the available time interval. FIG. 12 is a timing diagram showing the concept of dividing the available time interval into several shorter time intervals according to an embodiment of the invention. In the embodiment of the invention, the RAT module may divide the available time interval into several shorter time intervals $t_{ps}$ and perform a portion of the measurement task stepwise, where each step consumes a time duration $t_{ps}$. The portion of the measurement task may comprise, for example, measuring the corresponding frequencies of a portion of cells that are planned to be scanned. Upon every time the portion of the measurement task is completed, the 2G module may further check whether the entire measurement activity has been completed (Step S1306). The entire measurement activity may be determined completed when, for example, all cells or the cells in the cell list have been scanned, or when some satisfactory information regarding the measurement has been obtained. When the entire measurement activity has not been completed, the 2G module may further determine whether the remaining measurement task of the corresponding measurement activity can be performed in the remaining available time interval (Step S1307). If so, the process returns to step S1305 and the 2G module may arrange and perform the next portion of the measurement task for the corresponding measurement activity in the remaining available time interval. If the remaining measurement task of the corresponding measurement activity cannot be performed in the remaining available time interval, or if the entire 2G measurement activity has been completed, or when a 2G measurement activity is determined to not be required in step S1303, it is determined whether the 3G PLMN search has been completed (Step S1308). When the 3G PLMN search has not been completed, the process returns to step S1302 to perform at least one remaining channel activity for the 3G PLMN search. Otherwise, the 2G module may resume performing the remaining 2G PLMN search operations (Step S1309). Note that the 3G PLMN search may be determined to have been completed as after the location update has been performed as previously described. As a result, the 2G measurement activities may be arranged between any two 3G radio activities during the 3G PLMN search, as shown in FIG. 14.

Figure 15:
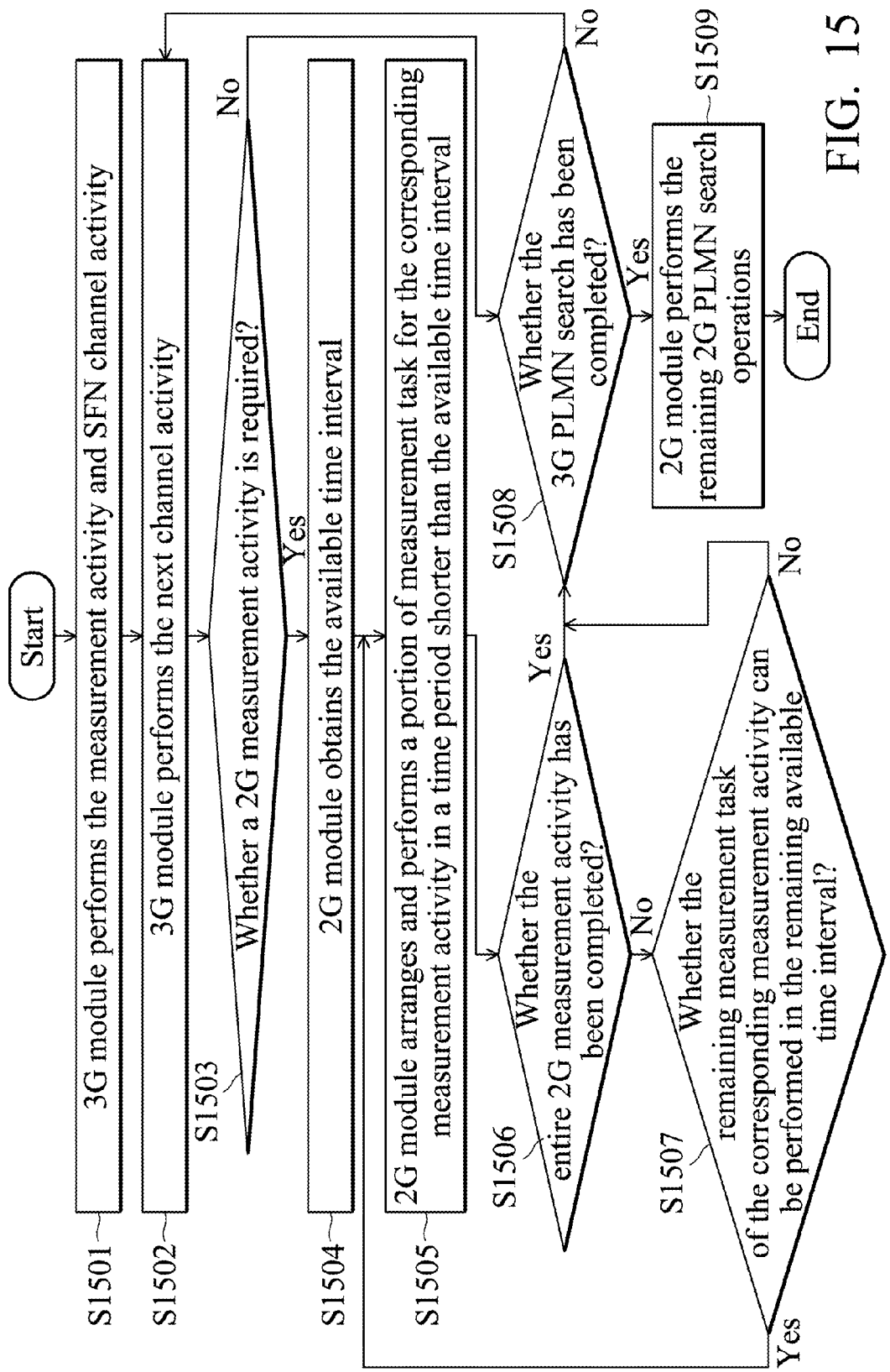
FIG. 15 is a flow chart showing a method for supporting the PLMN searches in different RATs with coordinated radio activities by using a shared antenna according to another embodiment of the invention.
Figure 16:
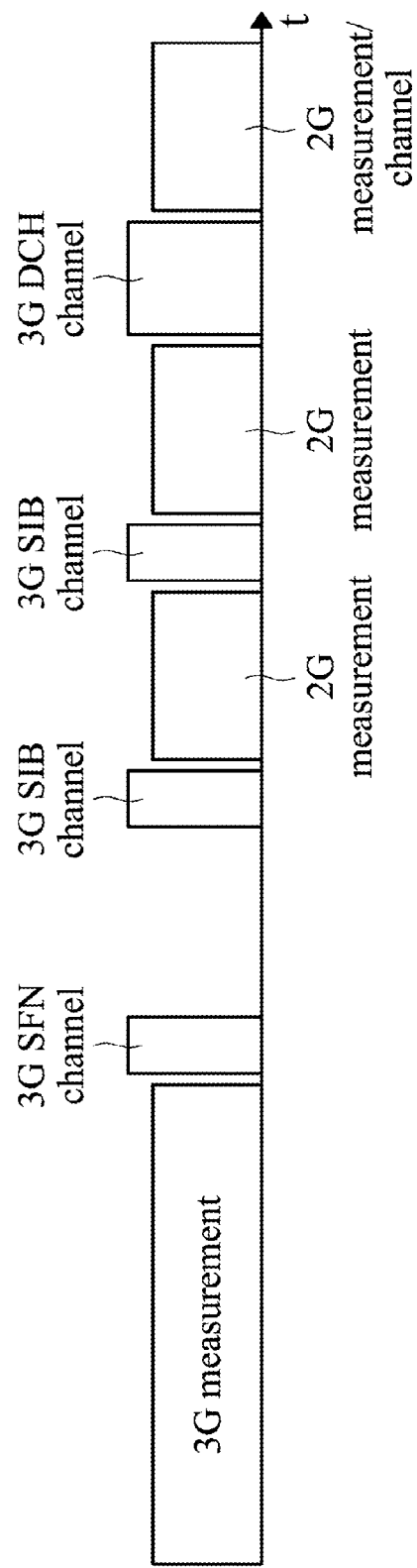
FIG. 16 is a timing diagram showing the coordinated radio activities of the PLMN searches in different RATs according to another embodiment of the invention.

FIG. 15 is a flow chart showing a method for supporting the PLMN search in different RATs with coordinated radio activities by using a shared antenna according to another embodiment of the invention. In this embodiment, the process begins with performing the 3G measurement activity and the SFN channel activity (step S1501), wherein the measurement activity may include at least the power scan operation and the cell search operation, and the channel activity may include listening to the SFN channel as previously described. After the 3G measurement and the SFN channel activity are completed, the 3G module may further perform the next channel activity, such as listening to the SIB channel as shown in FIG. 16 (Step S1502). Next, a loop composed of steps S1503 to S1508 may be repeatedly executed to check whether a 2G measurement activity can be performed up until the beginning of a forthcoming 3G channel activity, where the 3G channel activity may be listening to a SIB channel, or a location update via the DCH channel as mentioned above. Details of steps S1503 to S1509 may refer to the description of S1303 to S1309, and simply described here for brevity. As a result, the 2G measurement activities may be arranged between any two 3G channel activities subsequent to the SFN channel activity during the 3G PLMN search. The resulting time slot sequence is shown in FIG. 16.

Figure 17:
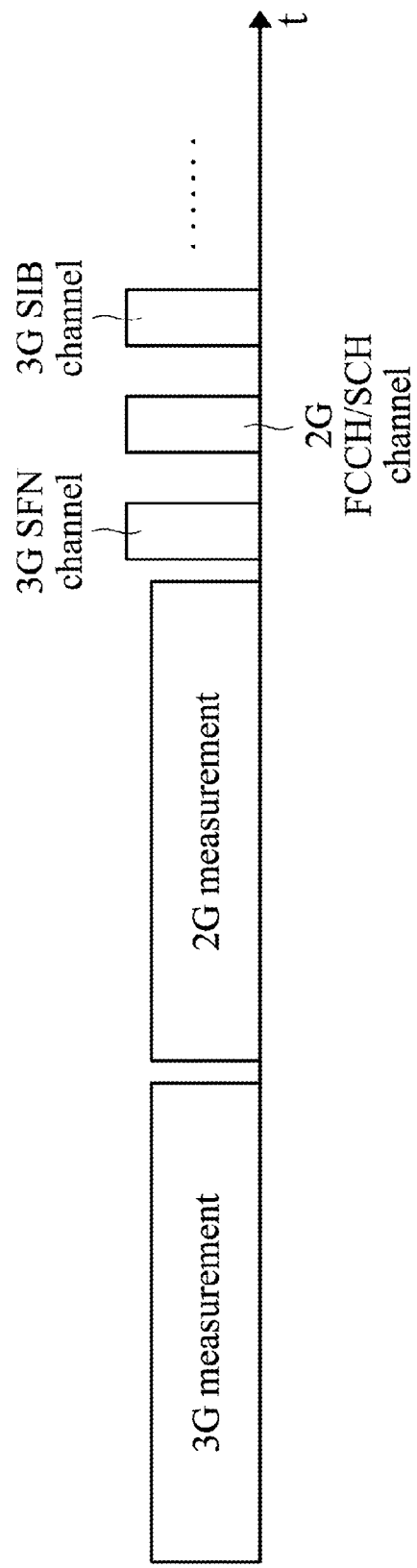
FIG. 17 is a timing diagram showing the coordinated radio activities of the PLMN searches in different RATs according to another embodiment of the invention.
Figure 18:
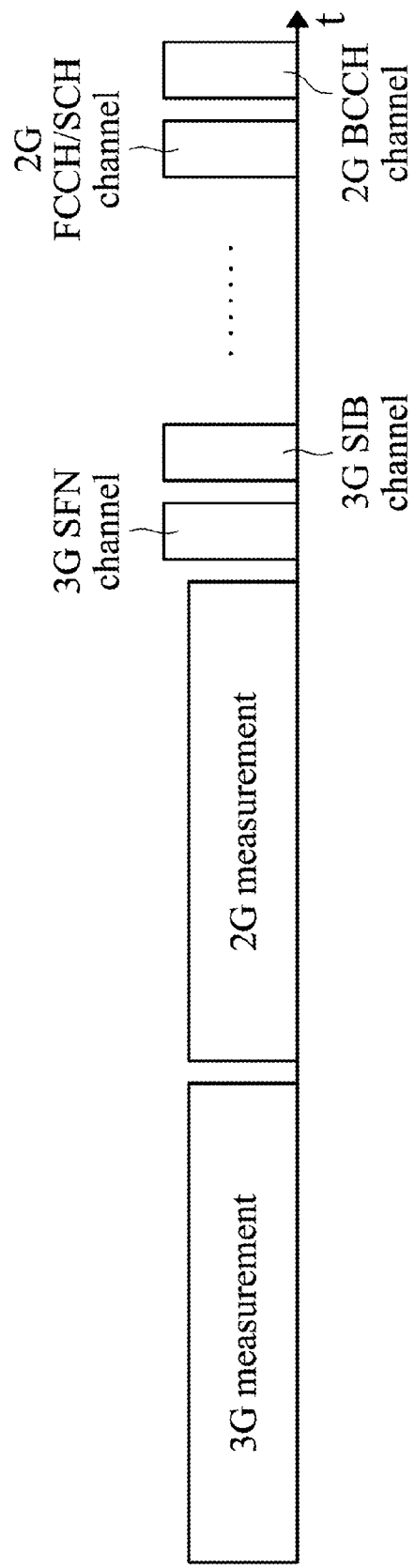
FIG. 18 is a timing diagram showing the coordinated radio activities of the PLMN searches in different RATs according to another embodiment of the invention.

FIG. 17 and FIG. 18 respectively show a timing diagram of the coordinated radio activities for performing the PLMN searches in different RATs according to still another embodiment of the invention. In these embodiments, the channel activities are arranged after the 2G and 3G measurement activities are both completed. As shown in FIG. 17, the 2G and 3G channel activities are interlaced so that the 2G and 3G modules may use the shared antenna in turn to perform the corresponding channel activities. On the other hand, as shown in FIG. 18, a plurality of 2G channel activities are arranged after the whole 3G channel activities for PLMN search are completed. The corresponding flow charts for these embodiments may be easily deduced from the flow charts as shown in FIGS. 13 and 15 for persons with ordinary skill in the art, and are omitted here for brevity.

Figure 19:
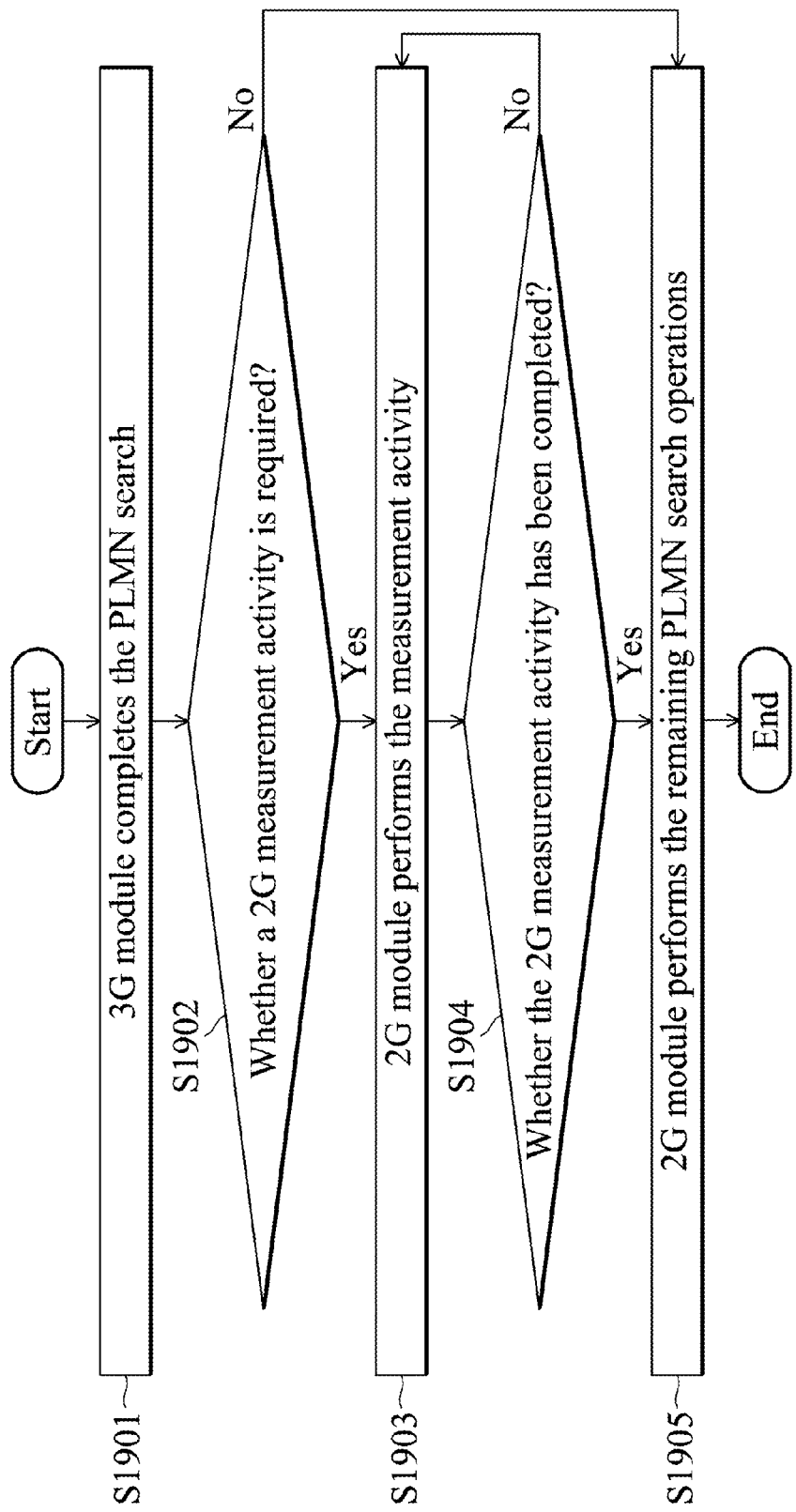
FIG. 19 is a flow chart showing a method for supporting the PLMN searches in different RATs with coordinated radio activities by using a shared antenna according to another embodiment of the invention.
Figure 20:
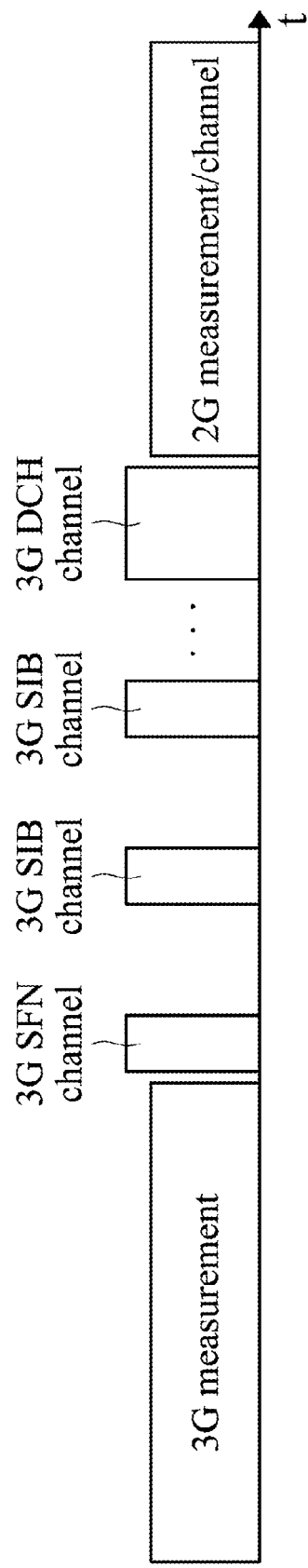
FIG. 20 is a timing diagram showing the coordinated radio activities of the PLMN searches in different RATs according to another embodiment of the invention.

According to yet another embodiment of the invention, the 2G measurement activity may be arranged after the entire 3G PLMN search has been completed. FIG. 19 is a flow chart showing a method for supporting the PLMN searches in different RATs with coordinated radio activities by using a shared antenna according to still another embodiment of the invention. In the embodiment, after the 3G module completes the PLMN search (Step S1901), the 2G module or the arbiter may check whether a 2G measurement activity for the 2G PLMN search is required (Step S1902). When the 2G measurement activity is required, the 2G module performs the measurement activity (Step S1903) and further determines whether the measurement activity has been completed (Step S1904). When the 2G measurement activity has not been completed, the process returns to step S1903. When the 2G measurement activity has been completed, or when the 2G measurement activity is not required, the 2G module performs the remaining PLMN search operations, such as the subsequent channel activities as previously described (Step S1905). As a result, the 2G and 3G PLMN searches are coordinated in a fashion without collisions. The resulting time slot sequence is shown in FIG. 20.

According to another aspect of the invention, taking the GSM PLMN search as an example, during the entire GSM PLMN search, one or more unoccupied time slots may be utilized to perform a power scan operation for the WCDMA module to accelerate the WCDMA PLMN search and the cell search as mentioned above. In the WCDMA power scan and the cell search, all of the possible WCDMA frequencies may be measured to locate one or more cells. In another way, when the communications apparatus has a frequency list, the WCDMA Baseband unit may direct the WCDMA RF unit to measure the listed frequencies. In still another way, the communications apparatus may merely scan several designated frequencies or a WCDMA band.

Figure 21:
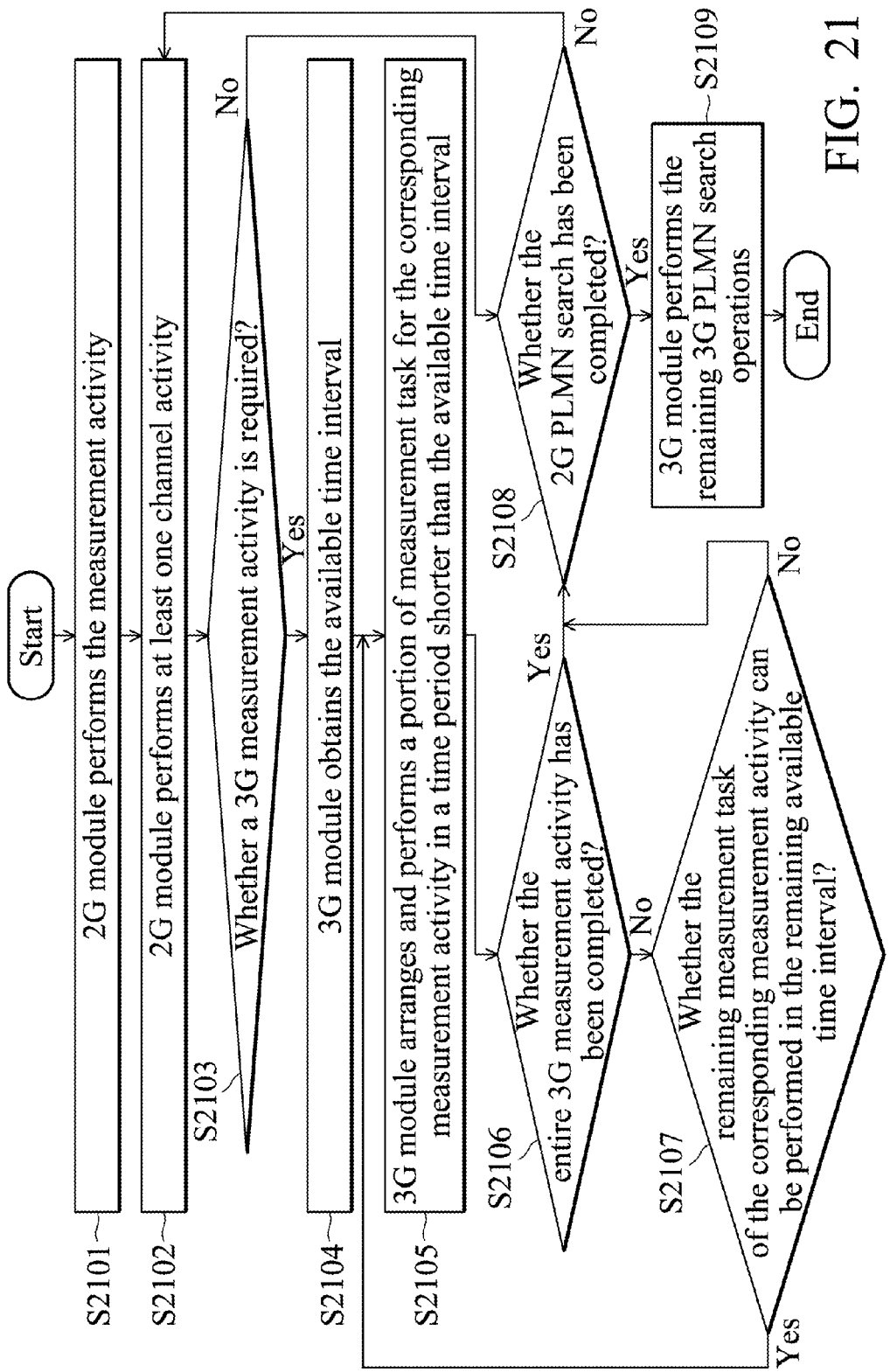
FIG. 21 is a flow chart showing a method for supporting the PLMN searches in different RATs with coordinated radio activities by using a shared antenna according to still another embodiment of the invention.
Figure 22:
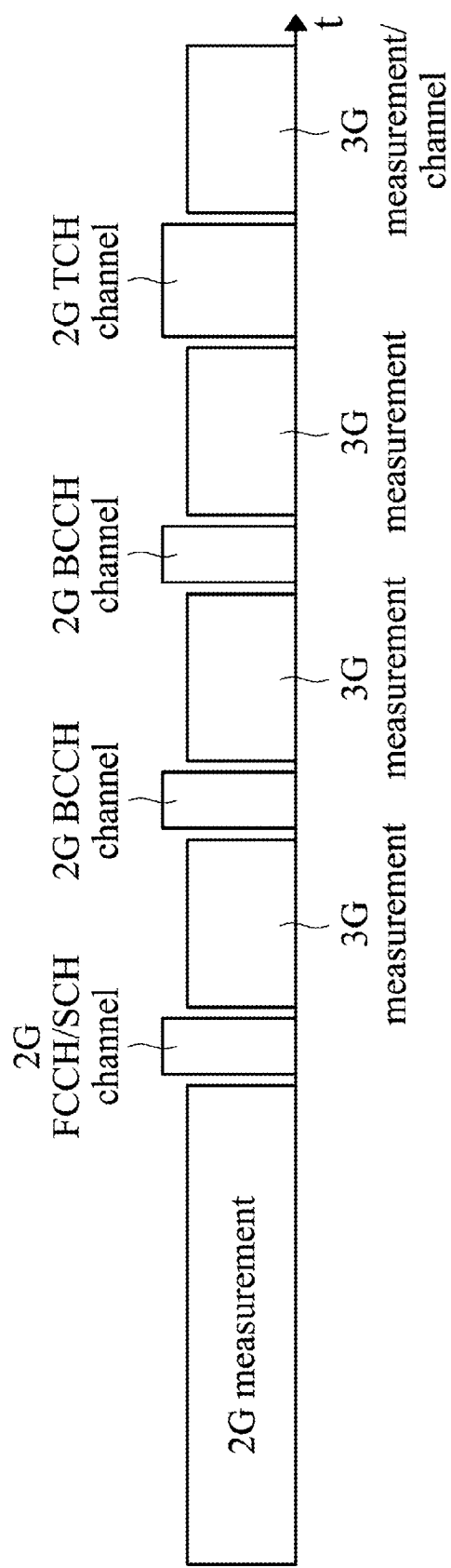
FIG. 22 is a timing diagram showing the coordinated radio activities of the PLMN searches in different RATs according to still another embodiment of the invention.

FIG. 21 is a flow chart showing a method for supporting the PLMN search in different RATs with coordinated radio activities by using a shared antenna according to still another embodiment of the invention. In this embodiment, the 2G PLMN search is initiated earlier than that of the 3G module. The process begins with performing the 2G measurement activity (step S2101). After the 2G measurement activity has been completed, the 2G module may further perform at least a channel activity as shown in FIG. 22 (Step S2102). Next, a loop may be repeatedly executed to check whether a 3G measurement activity can be performed up until the beginning of a forthcoming 2G channel activity, where the 2G channel activity may be listening to a FCCH, SCH or BCCH channel, or a location update via the TCH channel as mentioned above. At the beginning of each turn, the 2G module may notify the arbiter when channel activity has been completed. According to the embodiment of the invention, the 3G module or arbiter may first determine whether a 3G measurement activity is required (Step S2103). When a 3G measurement activity is required, the arbiter may estimate the available time interval $TI_{available}$ as shown in FIG. 11 up until the beginning of a forthcoming 2G channel activity, and notify the 3G module via a message Nfy_Avail_Time containing the estimated available time interval as previously described. After obtaining the available time interval (Step S2104), the 3G module may arrange and perform a portion of the measurement task for the corresponding measurement activity in a time period shorter than the available time interval (Step S2105). The portion of the measurement task may comprise, for example, measuring the corresponding frequencies of a portion of cells that are planned to be scanned.

According to an embodiment of the invention, the 3G module may also perform the corresponding measurement activity stepwise in the available time interval, where each step consumes a time duration $t_{ps}$ as shown in FIG. 12. Upon every time when the portion of the measurement task is completed, the 3G module may further check whether the entire 3G measurement activity has been completed (Step S2106). The entire measurement activity may be determined completed when, for example, all cells or the cells in the cell list have been scanned, or when some satisfactory information regarding the measurement has been obtained. When the entire measurement activity has not been completed, the 3G module may further determine whether the remaining measurement task of the corresponding measurement activity can be performed in the remaining available time interval (Step S2107). If so, the process returns to step S2105 and the 3G module may arrange and perform a portion of the measurement task for the corresponding measurement activity in the remaining available time interval. If the remaining measurement task of the corresponding measurement activity cannot be performed in the remaining available time interval, or if the entire 3G measurement activity has been completed, or when a 3G measurement activity is determined to not be required in step S2103, it is determined whether the 2G PLMN search has been completed (Step S2108). When the 2G PLMN search has not been completed, the process returns to step S2102 to perform at least one remaining channel activity for the 2G PLMN search. Otherwise, the 3G module may resume performing the remaining 3G PLMN search operations (Step S2109). Note that the 2G PLMN search may be determined to have been completed as after the location update has been performed as previously described. As a result, the 3G measurement activities may be arranged between any two 2G radio activities during 2G PLMN search, as shown in FIG. 22.

Figure 23:
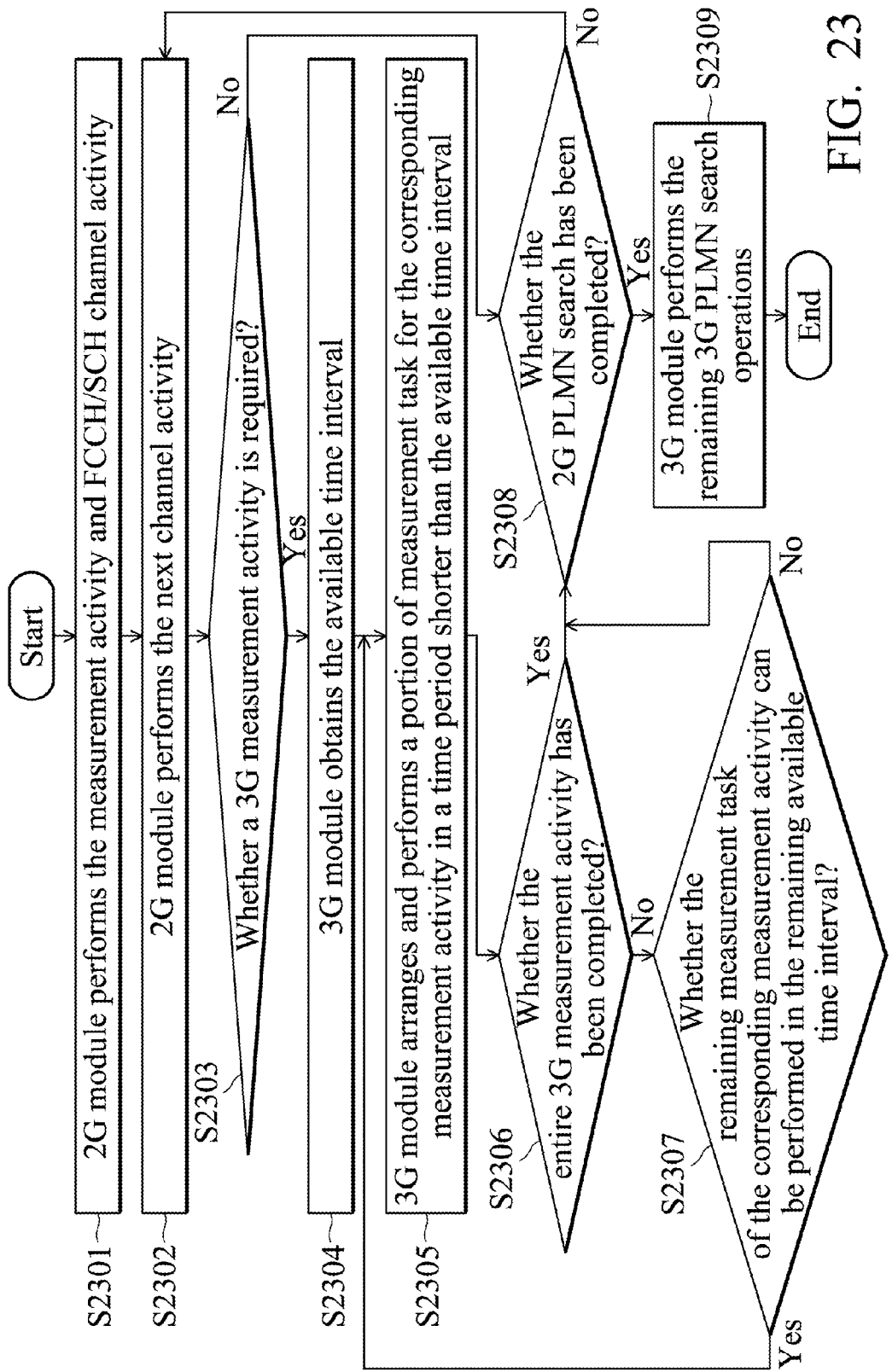
FIG. 23 is a flow chart showing a method for supporting the PLMN searches in different RATs with coordinated radio activities by using a shared antenna according to still another embodiment of the invention.
Figure 24:
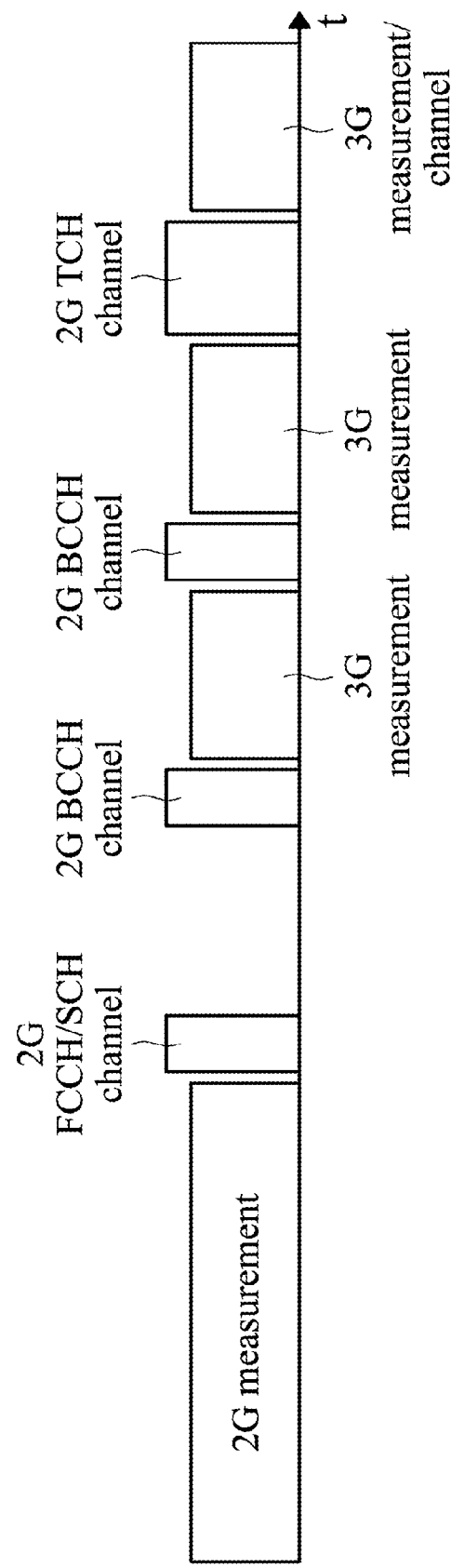
FIG. 24 is a timing diagram showing the coordinated radio activities of the PLMN searches in different RATs according to still another embodiment of the invention.

FIG. 23 is a flow chart showing a method for supporting the PLMN search in different RATs with coordinated radio activities by using a shared antenna according to still another embodiment of the invention. In this embodiment, the process begins with performing the 2G measurement activity and the FCCH/SCH channel activity (step S2301). After the 2G measurement and the FCCH/SCH channel activity are completed, the 2G module may further perform the next channel activity, such as listening to the BCCH channel as shown in FIG. 24 (Step S2302). Next, a loop composed of steps S2305 to S2308 may be repeatedly executed to check whether a 3G measurement activity can be performed up until the beginning of a forthcoming 2G channel activity, where the 2G channel activity may be listening to the BCCH channel, or a location update via the TCH channel as mentioned above.

Details of steps S2303 to S2309 may refer to the description of S2103 to S2109, and simply described here for brevity. As a result, the 3G measurement activities may be arranged between any two 2G channel activities subsequent to the FCCH/SCH channel activity during 2G PLMN search. The resulting time slot sequence is shown in FIG. 24.

According to yet other embodiments of the invention, the channel activities may be arranged after the 2G and 3G measurement activities are both completed. For example, the 2G and 3G channel activities may be interlaced so that the 2G and 3G modules may use the shared antenna in turn to perform the corresponding channel activities after the completion of the 2G and 3G measurement activities. For another example, a plurality of 3G channel activities are arranged after the whole 2G channel activities are completed. The corresponding flow charts and timing diagram for these embodiments may be easily deduced from the flow charts as shown in FIG. 21 and FIG. 23 and the timing diagrams as shown in FIG. 17 and FIG. 18 for persons with ordinary skill in the art, and are thereby omitted here for brevity.

Figure 25:
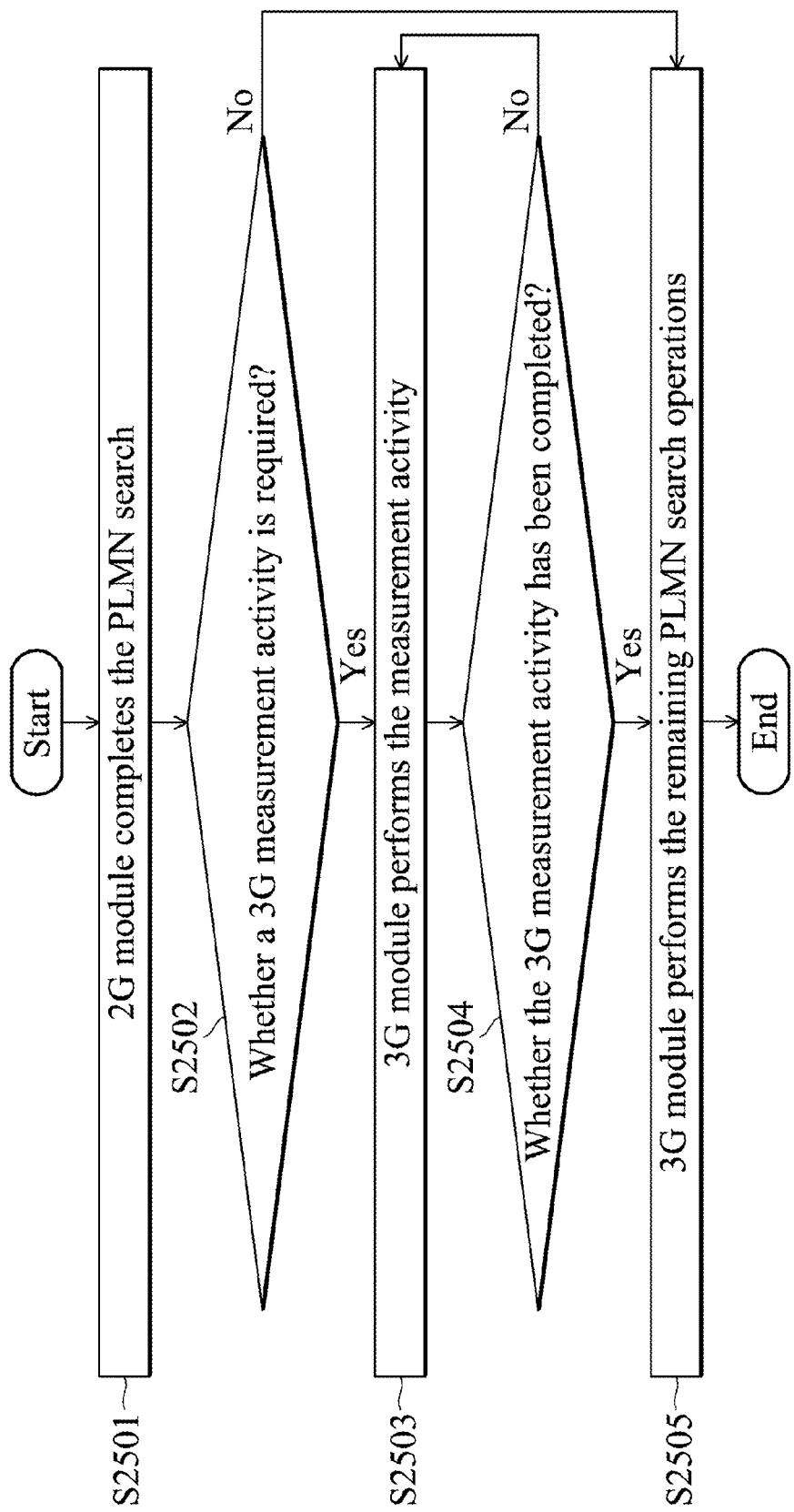
FIG. 25 is a flow chart showing a method for supporting the PLMN searches in different RATs with coordinated radio activities by using a shared antenna according to still another embodiment of the invention.
Figure 26:
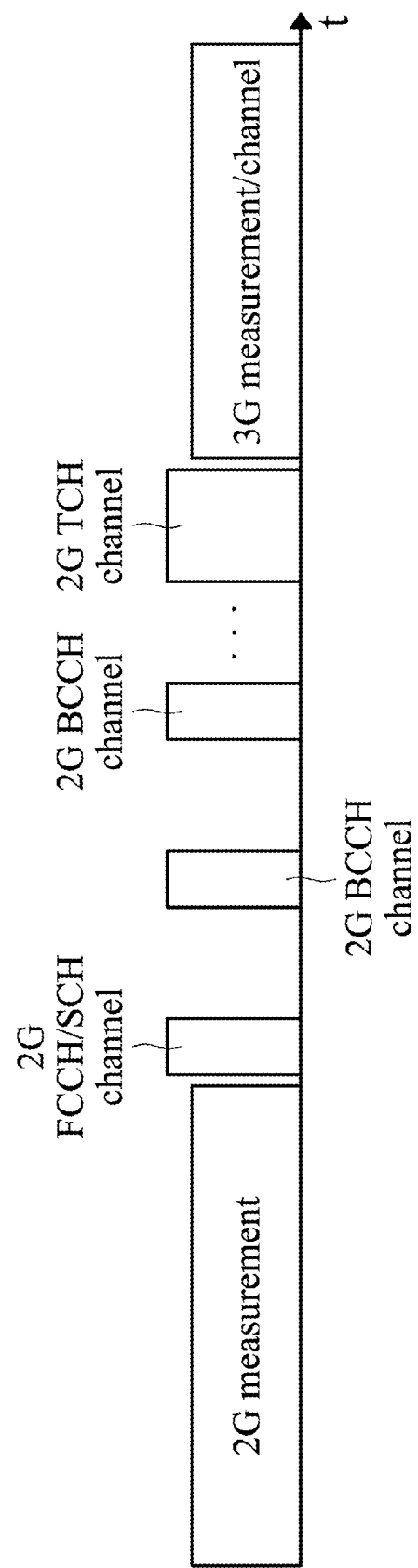
FIG. 26 is a timing diagram showing the coordinated radio activities of the PLMN searches in different RATs according to still another embodiment of the invention.

According to still another embodiment of the invention, the 3G measurement activity may be arranged after the entire 2G PLMN search has been completed. FIG. 25 is a flow chart showing a method for supporting the PLMN searches in different RATs with coordinated radio activities by using a shared antenna according to still another embodiment of the invention. In the embodiment, after the 2G module completes the PLMN search (Step S2501), the 3G module or the arbiter may check whether a 3G measurement activity for the 3G PLMN search is required (Step S2502). When the 3G measurement activity is required, the 3G module performs the measurement activity (Step S2503) and further determines whether the measurement activity has been completed (Step S2504). When the 3G measurement activity has not been completed, the process returns to step S2503. When the 3G measurement activity has been completed, or when the 3G measurement activity is not required, the 3G module performs the remaining PLMN search operations, such as the subsequent channel activities as previously described (Step S2505). As a result, the 2G and 3G PLMN searches are coordinated in a fashion without collisions. The resulting time slot sequence is shown in FIG. 26.

According to another aspect of the invention, a second group of embodiments of coordinating the radio activities between different RAT modules when performing regular measurement activities in idle mode will be introduced. After the PLMN searches and camps on a suitable cell, the RAT modules may enter the idle mode for power saving. In the idle mode, the RAT modules may still have to wake up at predetermined times to listen to some channels for receiving corresponding broadcast system information. For example, the RAT modules may periodically wake up to listen to the paging indication channel to check whether there is a possible transmission to come. In addition, the RAT modules may further perform regular measurement activities for measuring signal power of the serving cell and/or at least one neighbor cell for a possible cell reselection so that the RAT modules may always camp on the cell with the best signal quality.

Figure 27:
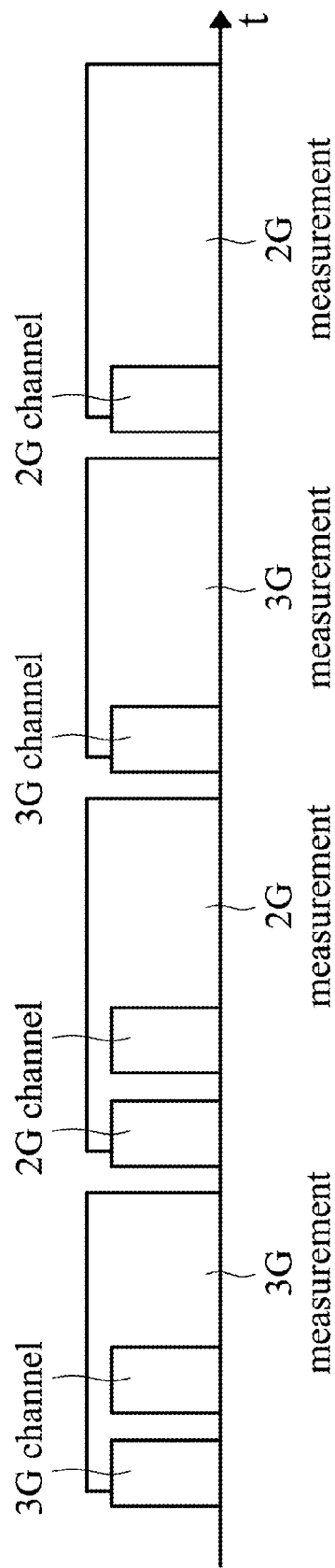
FIG. 27 is a timing diagram showing the coordinated measurement and channel activities in different RATs according to an embodiment of the invention.

According to the embodiments of the invention, when there is only one antenna shared between different RAT modules, measurement activities may be arranged or scheduled to accompany the channel activities. FIG. 27 is a timing diagram showing the coordinated measurement and channel activities in different RATs according to an embodiment of the invention. As shown in FIG. 27, each measurement activity may be arranged to accompany one or more 3G channel activity in the same RAT. For example, the 3G module may transmit a request to the arbiter to perform one or more channel activities for transmitting or receiving information to or from the cellular network, and further request that a measurement activity is to be performed for measuring signal power of a serving cell and/or at least one neighbor cell in the cellular network during the break time of successive channel activities and/or after completion of the channel activities. The 3G measurement activity may be continued up until the beginning of a forthcoming 2G channel activity. Therefore, the measurement activity may be performed in the break time between two channel activities by different RAT modules. Similarly, the 2G measurement activity may also be arranged when any 2G channel activity is going to be performed, and may be continued up until the beginning of a forthcoming 3G channel activity. Note that the available time interval between two channel activities may be obtained by the arbiter or the corresponding RAT module as previously described.

In addition, when the measurement activity of a RAT module cannot be completed within the available time interval, the RAT module may suspend the measurement activity and record the progress before beginning the channel activity of another RAT module. The suspended measurement activity may be resumed with a next channel activity of the RAT module. As an example, when the 3G module requests a subsequent channel activity to be performed as previously described, the arbiter may schedule the suspended measurement activity to be resumed after completion of the requested 3G channel activity. Therefore, the remaining measurement activity may be completely performed after a subsequent 3G channel activity. The suspension and resumption of the 2G/3G measurement activity are also shown in FIG. 27. According to another embodiment of the invention, since the channel activity generally has a higher priority activity than that of the regular measurement activity, the measurement activity may be suspended when a channel activity is suddenly required by either RAT module. The measurement activity may be suspended when the sudden channel activity is requested, and resumed after completion of a subsequent channel activity by the same RAT module as previously described.

Figure 28:
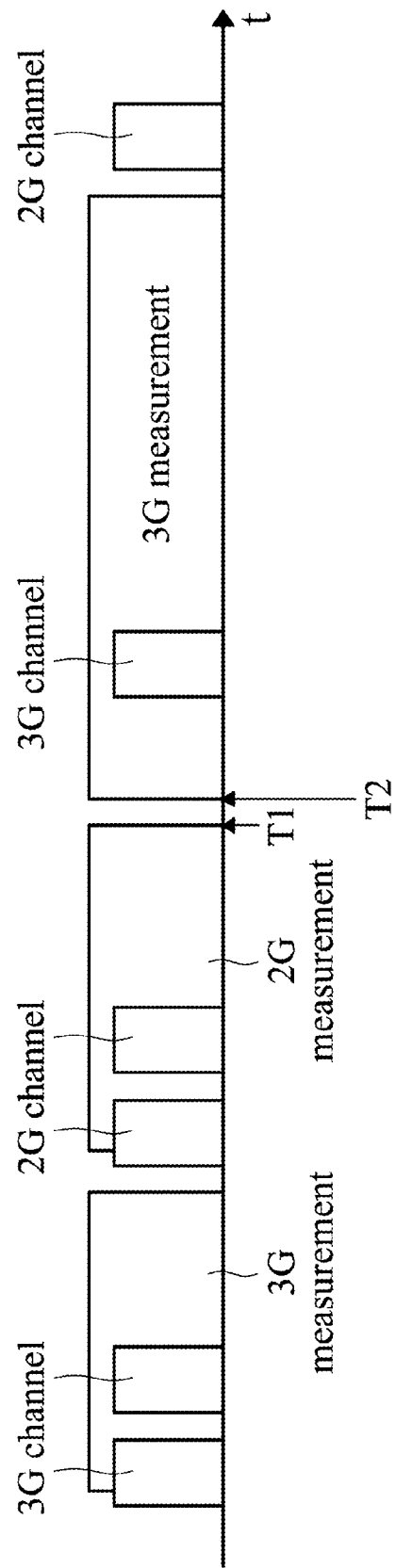
FIG. 28 is a timing diagram showing the coordinated measurement and channel activities in different RATs according to another embodiment of the invention.
Figure 29:
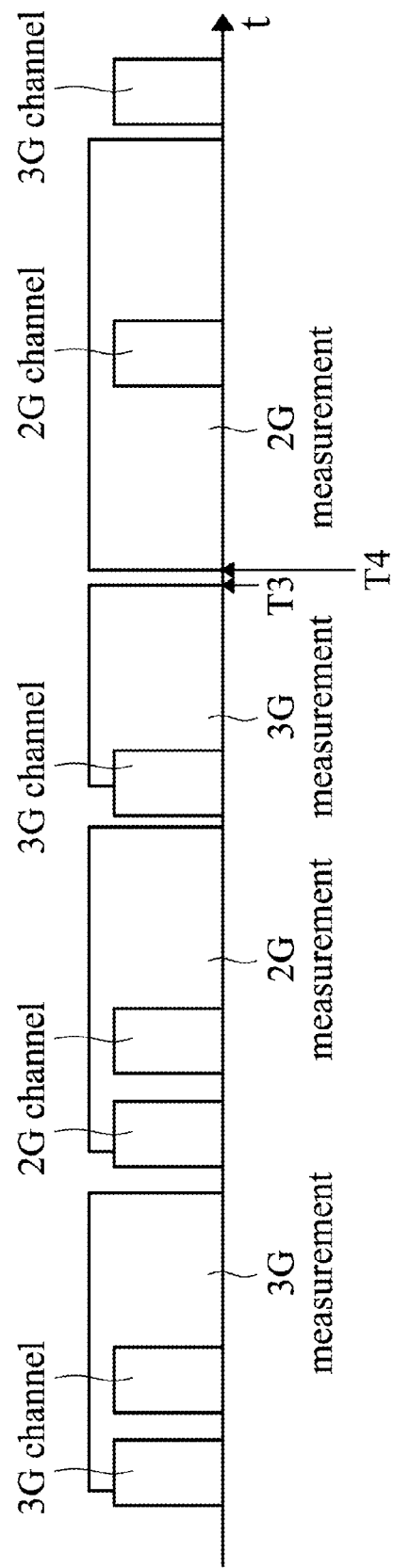
FIG. 29 is a timing diagram showing the coordinated measurement and channel activities in different RATs according to still another embodiment of the invention.

FIG. 28 is a timing diagram showing the coordinated measurement and channel activities in different RATs according to another embodiment of the invention. According to the embodiment of the invention, the measurement activity of a RAT module may be scheduled right after completion of the measurement or channel activity by another RAT module. That is, either RAT module may perform the measurement activity once the antenna is available, without waiting for the beginning of a subsequent channel activity. As shown in FIG. 28, after completion of a 2G measurement activity at time T1, the 3G measurement activity may be scheduled and performed (or resumed) immediately, at time T2. Note that as previously described, after a radio activity has been completed, a corresponding Baseband unit may tick the RTB software module or transmit an indication signal to the RTB software to inform of its completion. Therefore, the arbiter may notify a counterpart RAT module different from the ticking one to perform the measurement activity right after the completion. FIG. 29 is a timing diagram showing the coordinated measurement and channel activities in different RATs according to still another embodiment of the invention. Similarly, as shown in FIG. 29, after completion of a 3G measurement activity at time T3, the 2G measurement activity may be scheduled and performed (or resumed) immediately, at time T4.

Figure 30:
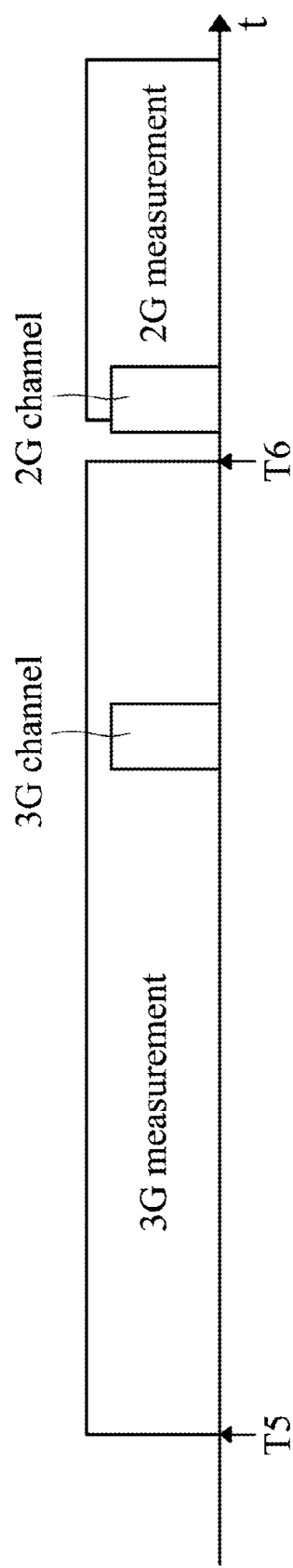
FIG. 30 is a timing diagram showing the coordinated measurement and channel activities in different RATs according to still another embodiment of the invention.
Figure 31:
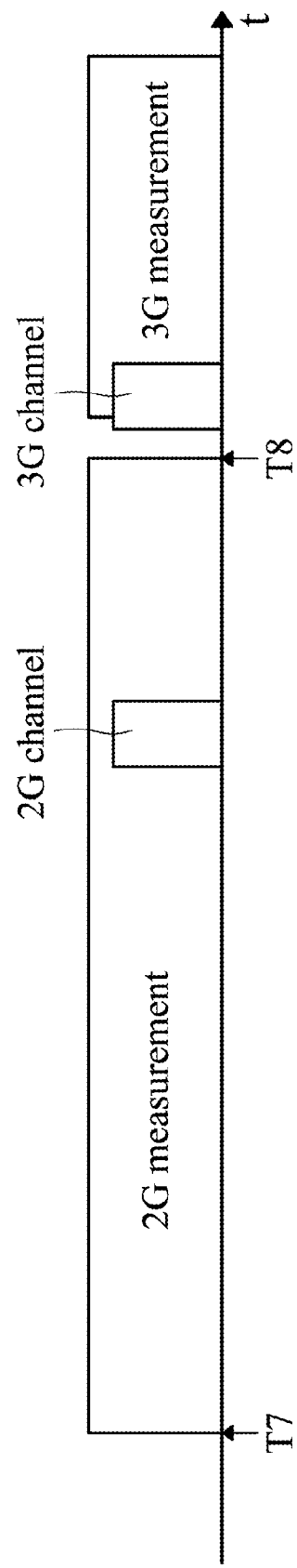
FIG. 31 is a timing diagram showing the coordinated measurement and channel activities in different RATs according to still another embodiment of the invention.

According to still another embodiment of the invention, the measurement activity may further be scheduled immediately, when there is no other requested channel activities or suspended measurement activities which have to be performed. FIG. 30 is a timing diagram showing the coordinated measurement and channel activities in different RATs according to still another embodiment of the invention. As shown in FIG. 30, when there is no other requested channel activities or suspended measurement activities which have to be performed, the 3G measurement activity may be performed immediately, in time T5 without waiting for the beginning of any 3G channel activity. The 3G measurement activity may be performed up until the time T6 before the beginning of a forthcoming 2G channel activity. FIG. 31 is a timing diagram showing the coordinated measurement and channel activities in different RATs according to still another embodiment of the invention. Similarly, as shown in FIG. 31, when there is no other requested channel activities or suspended measurement activities which have to be performed, the 2G measurement activity may be performed immediately, in time T7 without waiting for the beginning of any 2G channel activity. The 2G measurement activity may be performed up until the time T8 before the beginning of a forthcoming 3G channel activity.

Figure 32:
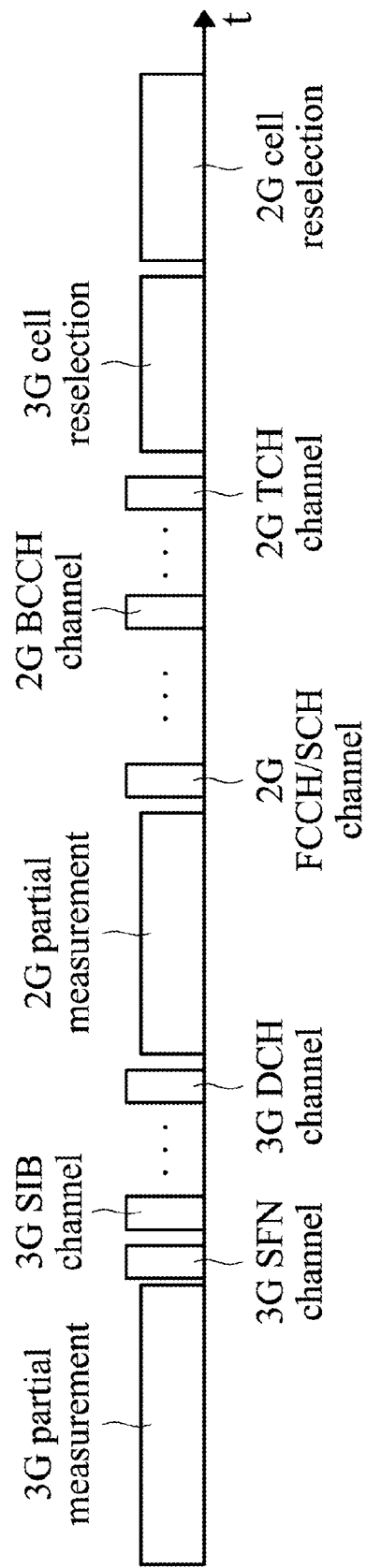
FIG. 32 is a timing diagram showing the coordinated measurement and channel activities for supporting partial PLMN searches in different RATs according to an embodiment of the invention.

According to still another aspect of the invention, a third group of embodiments of coordinating the radio activities between different RAT modules when partial PLMN searches are performed will be introduced. Different from the full PLMN search, a partial PLMN search is a procedure comprising at least one partial measurement activity for scanning signal power of a portion of, instead of all, cells in a cell list, and at least one channel activity for transmitting or receiving information to or from the scanned cell. In the third group of embodiments, instead of scanning all cells in the cell list as required in a full PLMN search, the partial PLMN search may be first performed so as to camp on a qualified cell as a serving cell as fast as possible. Specifically, the measurement activity is stopped once a qualified cell is found, and then, relevant channel activities are performed to camp on the qualified cell. The qualified cell means that signal strength broadcasted thereby exceeds a threshold. Note that the camped on cell may not be the best cell at that time if that cell is skipped to be measured. After both the RAT modules camp on their cells, for each RAT module, a cell reselection may further be performed to locate a better neighboring cell for one RAT module, if existing, with better signal quality than that of the serving cell. FIG. 32 is a timing diagram showing the coordinated measurement and channel activities for supporting partial PLMN searches in different RATs according to an embodiment of the invention. As shown in FIG. 32, after the 3G module performs the partial measurement activity and the corresponding channel activities for a partial 3G PLMN search to camp on a qualified cell selected from a portion of cells as the serving cell of the 3G module, the 2G module also performs a partial 2G PLMN search to camp on a qualified cell selected from a portion of cells as the serving cell of the 2G module. When both the 3G and 2G modules camp on qualified cells as their serving cells, a 3G cell reselection may be further performed for the 3G module, and a 2G cell reselection procedure may further be performed for the 2G module. Note that according to an embodiment of the invention, the cell reselection may be performed by scanning signal power of neighboring cells of the serving cell and selecting a cell with better signal quality.

Figure 33A:
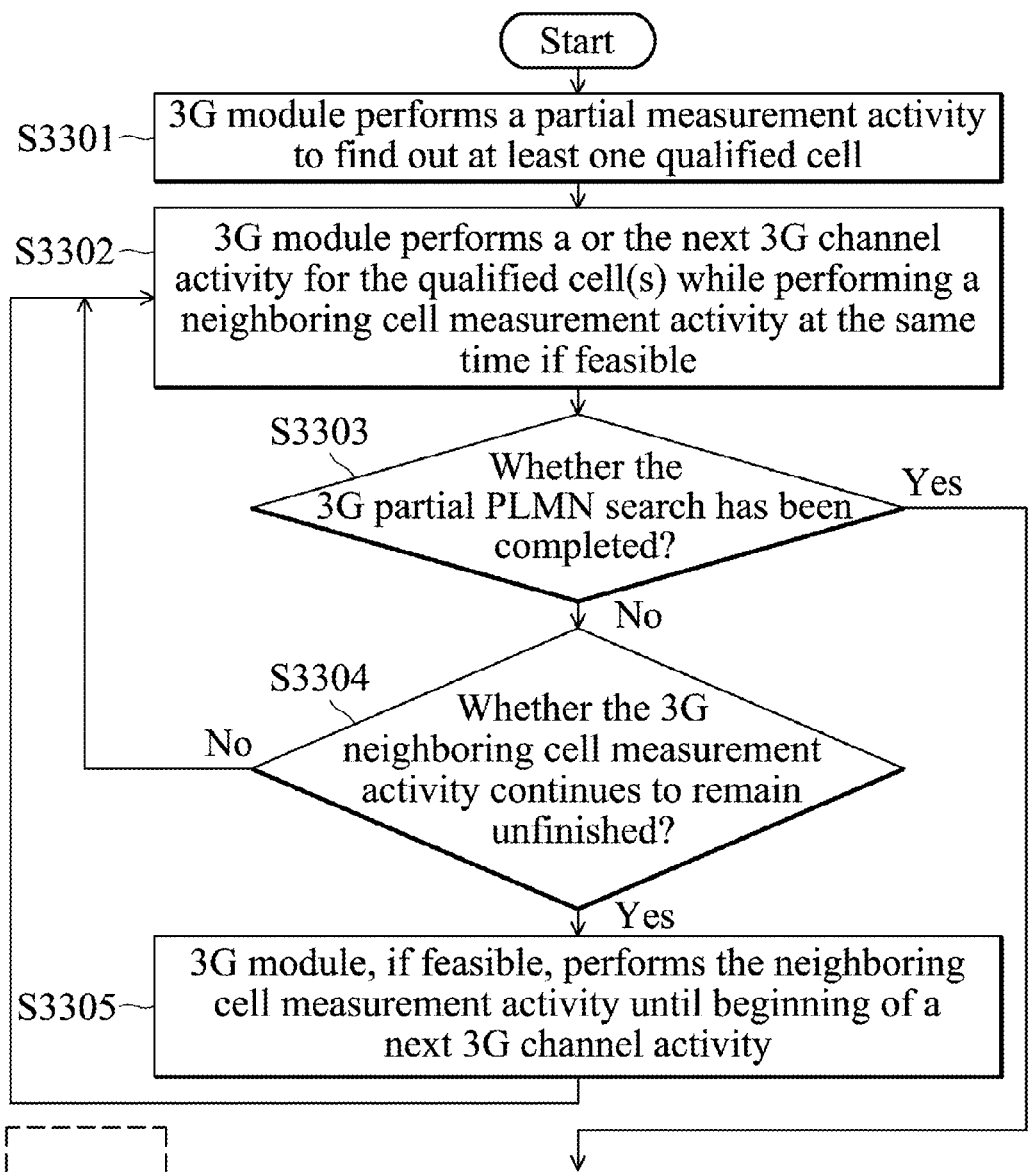
FIG. 33A and FIG. 33B are the flow charts showing a method for supporting partial PLMN searches in different RATs with coordinated radio activities by using a shared antenna according to an embodiment of the invention.
Figure 33B:
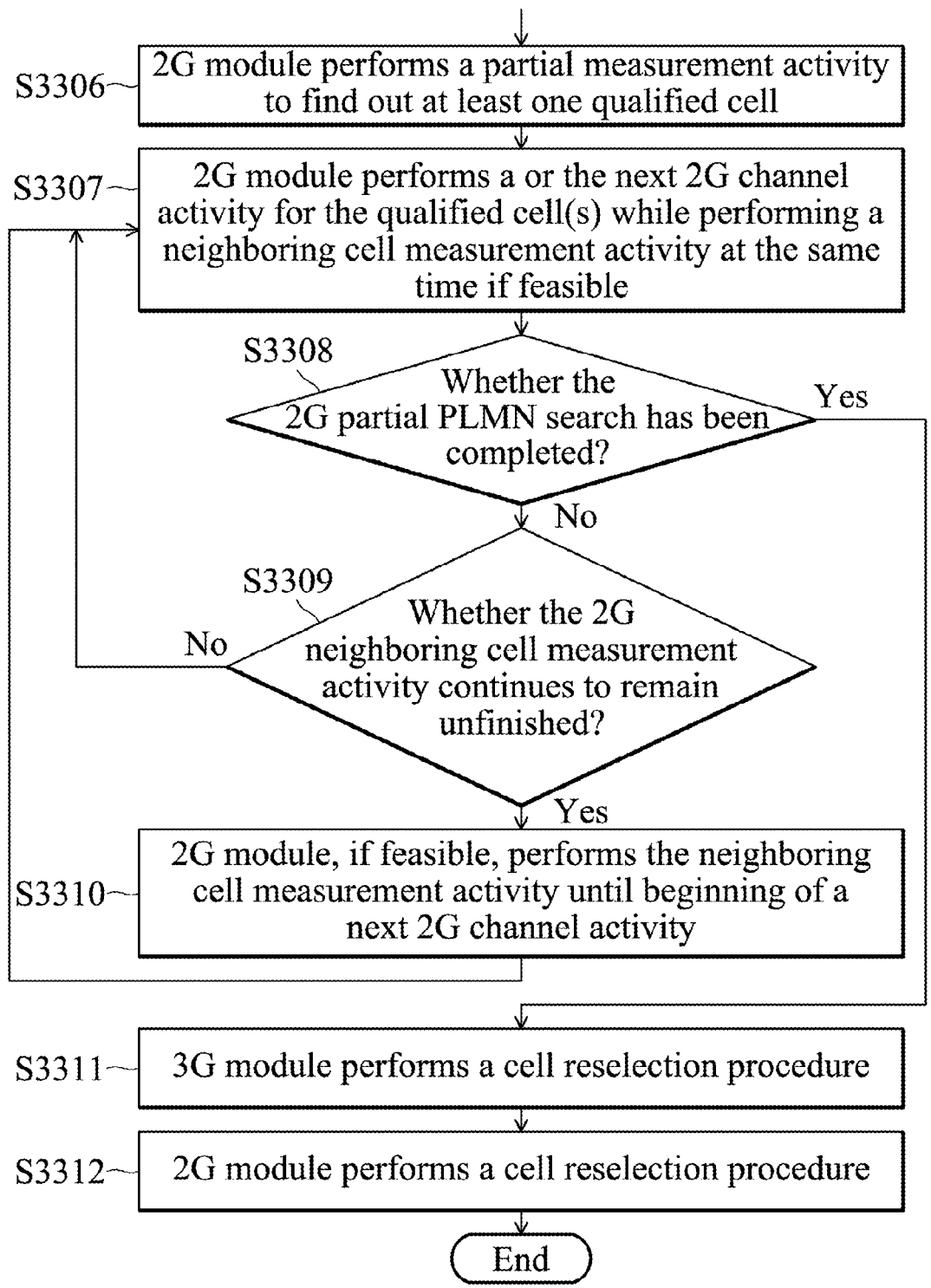
Figure 34:
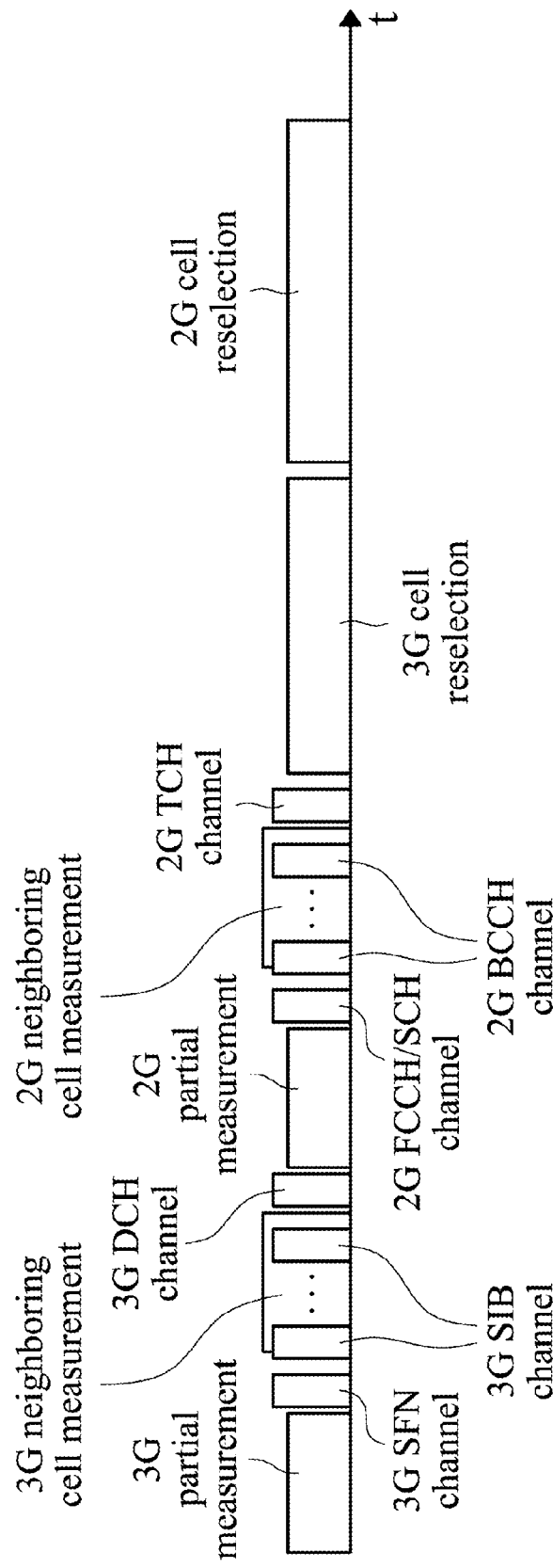
FIG. 34 is a timing diagram showing the coordinated measurement and channel activities in different RATs according to an embodiment of the invention.

According to another embodiment of the invention, the radio activities for the 2G and 3G partial PLMN searches may further be coordinated in a multiplexing manner as previously described in the first and second groups of embodiments until one of the 2G and 3G modules camps on a cell. FIG. 33A and FIG. 33B are the flow charts showing a method for supporting partial PLMN searches in different RATs with coordinated radio activities by using a shared antenna according to an embodiment of the invention. FIG. 34 is a resulting timing diagram based on the flow charts shown in FIG. 33A and FIG. 33B. In this embodiment, the 3G partial PLMN search is initiated earlier than that of the 2G module. Note that it is easy for persons with ordinary skill in the art to deduce the flow chart and timing diagram for the 2G module initiating the 2G partial PLMN first from FIG. 33A, FIG. 33B and FIG. 34 and therefore, the invention should not be limited thereto. To begin with, the 3G module performs a partial measurement activity to locate at least one qualified cell (Step S3301). Next, the 3G module performs a or the next 3G channel activity for the qualified cell(s) while performing a measurement activity for the neighboring cells of the qualified cell at the same time if feasible (Step S3302). It is to be understood that the neighboring cells can be measured when the 3G module successfully obtains the neighboring cell list from broadcast system information blocks as described above. Note that the 3G channel activity may be listening to an SFN or SIB channel, or a location update via the DCH channel as mentioned above, and the resulting time slots of the scheduled radio activities are shown in FIG. 34. Note also that the partial measurement activity performed in step S3301 may be scanning a portion of cells in a cell lists, for example, scanning ⅓ of the cells, or scanning a portion of cells up until a qualified cell is found, and the neighboring cell measurement activity performed in step S3302 may be scanning the neighboring cells of the qualified cell if feasible. Next, the arbiter or the 3G module determines whether the 3G partial PLMN search has been completed (Step S3303). The partial PLMN may be determined to have been completed after camping on the qualified cell and performing location update as previously described. When the 3G partial PLMN search has not been completed, the arbiter or the 3G module further determines whether the 3G neighboring cell measurement activity continues to remain unfinished (Step S3304). The neighboring cell measurement activity may be determined completed when, for example, the neighboring cells have been completely scanned.

When the 3G neighboring cell measurement activity continues to remain unfinished, the 3G module performs the neighboring cell measurement activity for the qualified cell up until beginning of a next 3G channel activity (Step S3305). Note that, taking neighboring cell measurement activity into the process for camping on the qualified cell may reduce time for the forthcoming 3G cell reselection. When the 3G neighboring cell measurement activity has been completed, or when a next 3G channel activity begins, the process returns to step S3302. On the other hand, when the 3G partial PLMN search is determined to have been completed in step S3303, the process goes to step S3306, in which the 2G module performs a partial measurement activity to locate at least one qualified cell (Step S3306). Next, the 2G module performs a or the next 2G channel activity for the qualified cell(s) while performing a measurement activity for the neighboring cells of the qualified cell at the same time if feasible (Step S3307). It is to be understood that the neighboring cells can be measured when the 2G module successfully obtains the neighboring cell list from broadcast system information as described above. Note that the 2G channel activity may be listening to a FCCH, SCH or BCCH channel, or a location update via the TCH channel as mentioned above. The resulting time slots of the scheduled radio activities is shown in FIG. 34. Next, the arbiter or the 2G module determines whether the 2G partial PLMN search has been completed (Step S3308). The partial PLMN may be determined to have been completed after camping on the qualified cell and performing location update as previously described. When the 2G partial PLMN search has not been completed, the arbiter or the 2G module further determines whether the 2G neighboring cell measurement activity continues to remain unfinished (Step S3309). The neighboring cell measurement activity may be determined completed when, for example, the neighboring cell cells have been completely scanned. When the 2G neighboring cell measurement activity continues to remain unfinished, the 2G module performs the neighboring cell measurement activity for the qualified cell up until beginning a next 2G channel activity (Step S3310). Note that, taking neighboring cell measurement activity into the process for camping on the qualified cell may reduce time for the forthcoming 2G cell reselection. When the 2G neighboring cell measurement activity has been completed, or when a next 2G channel activity begins, the process returns to step S3307. On the other hand, when the 2G partial PLMN search is determined to have been completed in step S3308, the process goes to step S3311, in which the 3G module performs a cell reselection procedure for camping on a better cell if required. After the cell reselection of the 3G module has been completed, the 2G module may further perform a cell reselection procedure in step S3312 for camping on a better cell if required. According to the embodiment of the invention, the 3G and 2G cell reselections may be performed according to the measurement results respectively obtained in steps S3302 and S3307.

Figure 35A:
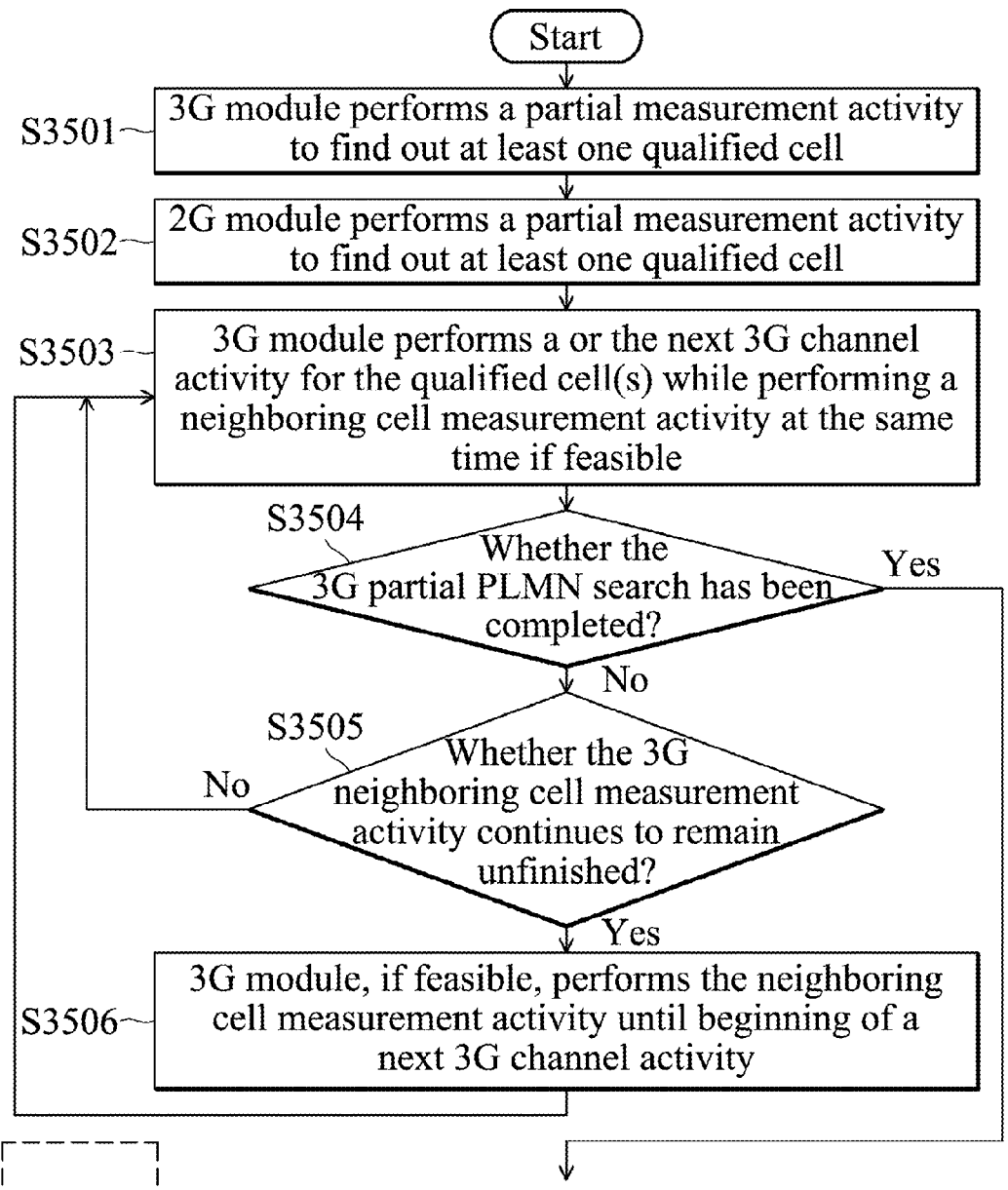
FIG. 35A and FIG. 35B are the flow charts showing a method for supporting partial PLMN searches in different RATs with coordinated radio activities by using a shared antenna according to another embodiment of the invention.
Figure 35B:
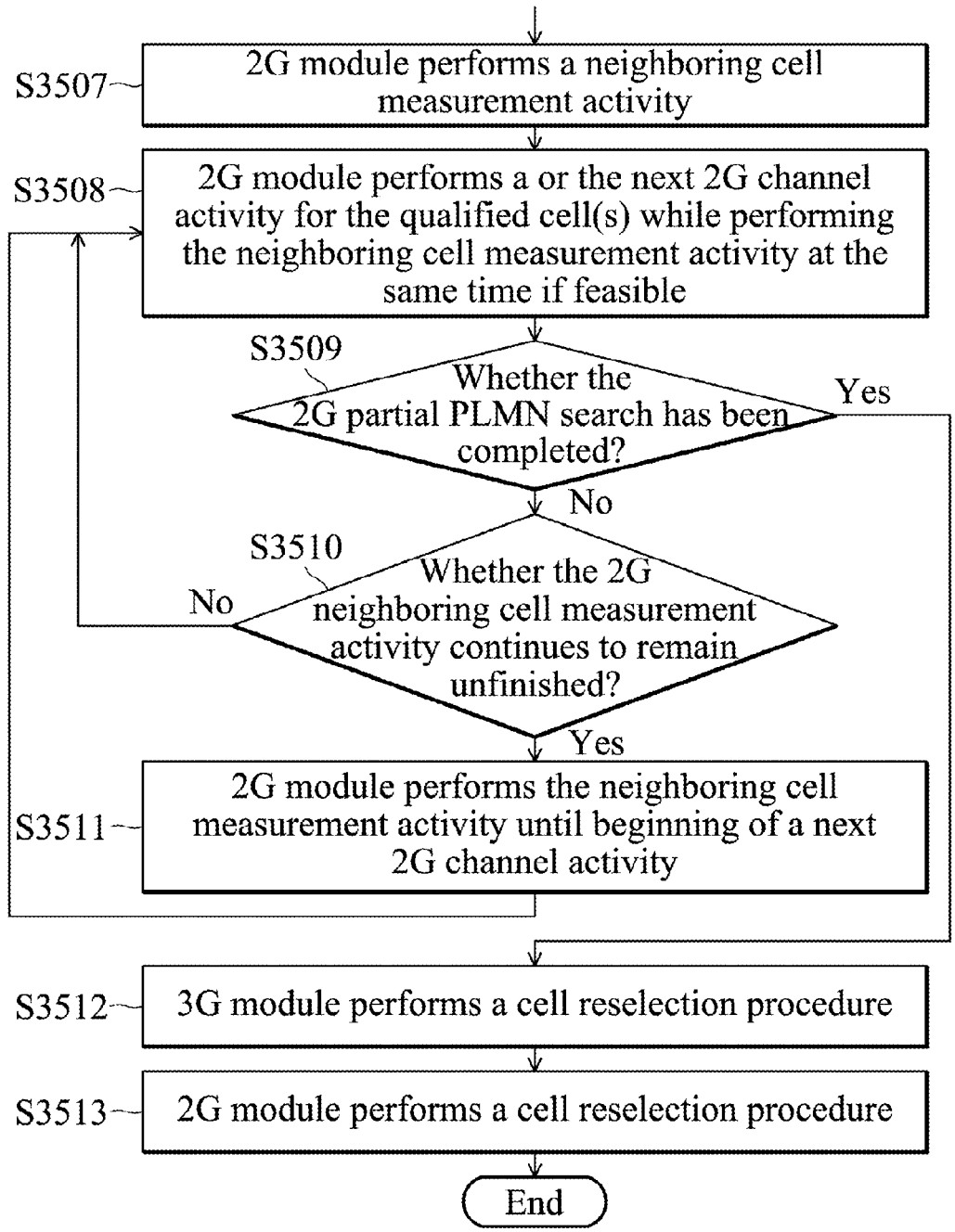
Figure 36:
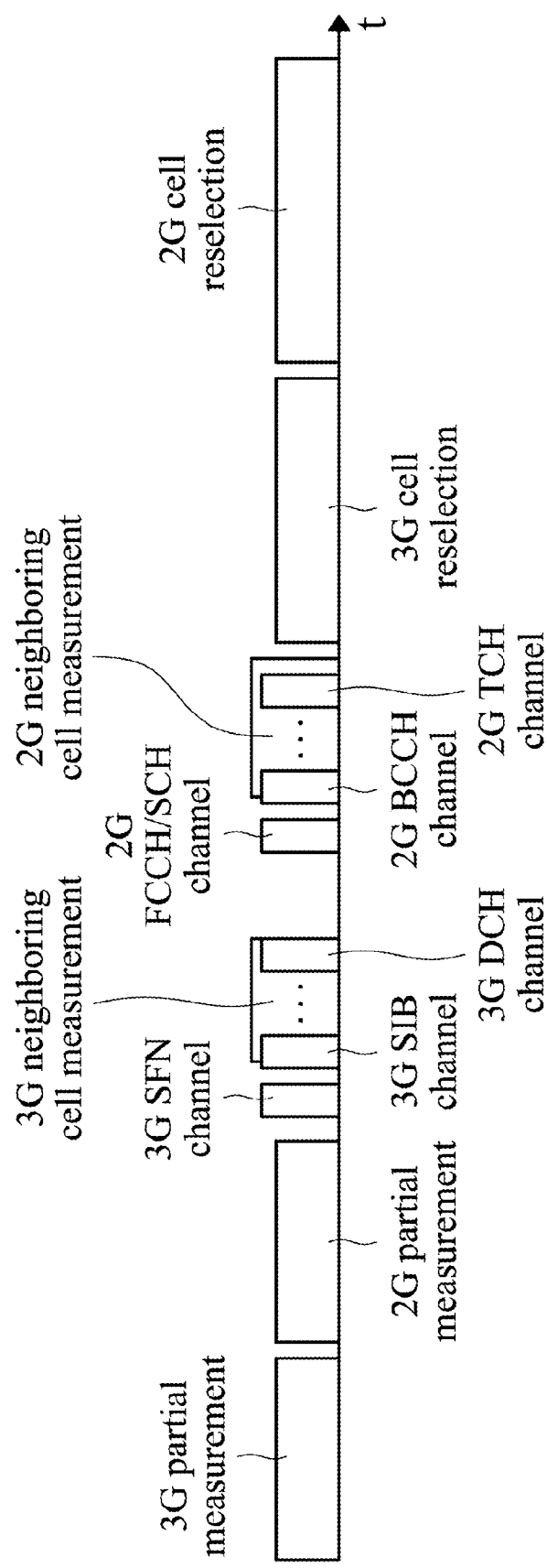
FIG. 36 is a timing diagram showing the coordinated measurement and channel activities in different RATs according to another embodiment of the invention.

FIG. 35A and FIG. 35B are the flow charts showing a method for supporting partial PLMN searches in different RATs with coordinated radio activities by using a shared antenna according to another embodiment of the invention. FIG. 36 is the resulting timing diagram based on the flow charts shown in FIG. 35A and FIG. 35B. In this embodiment, the 2G partial measurement activity may be arranged and performed before performing the 3G channel activity for the qualified cell(s). Note that as shown in the exemplary flow charts and timing diagram, the 3G partial PLMN search is initiated earlier than that of the 2G module. However, it is easy for persons with ordinary skill in the art to deduce the flow chart and timing diagram for the 2G module initiating the 2G partial PLMN first from FIG. 35A, FIG. 35B and FIG. 36. Therefore, the invention should not be limited thereto. To begin with, the 3G module performs a partial measurement activity to locate at least one qualified cell (Step S3501). Next, the 2G module performs a partial measurement activity to locate at least one qualified cell (Step S3502). Next, the 3G module performs a or the next 3G channel activity for the qualified cell(s) while performing a measurement activity for the neighboring cells at the same time if feasible (Step S3503). The resulting time slots of the scheduled radio activities are shown in FIG. 36. Next, the arbiter or the 3G module determines whether the 3G partial PLMN search has been completed (Step S3504). When the 3G partial PLMN search has not been completed, the arbiter or the 3G module further determines whether the 3G neighboring cell measurement activity continues to remain unfinished (Step S3505). When the 3G neighboring cell measurement activity continues to remain unfinished, the 3G module performs the neighboring cell measurement activity for the qualified cell up until beginning of a next 3G channel activity (Step S3506).

Figure 37:
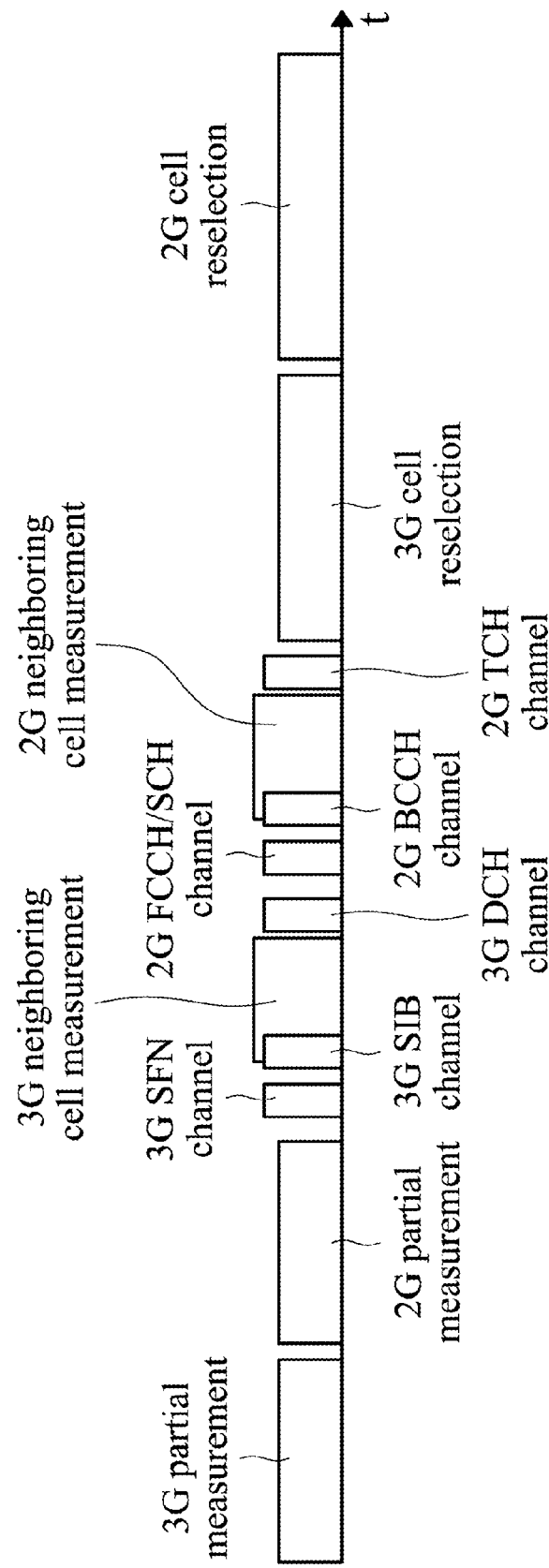
FIG. 37 is a timing diagram showing the coordinated measurement and channel activities in different RATs according to yet another embodiment of the invention.

When the 3G neighboring cell measurement activity has been completed, or when a next 3G channel activity begins, the process returns to step S3503. On the other hand, when the 3G partial PLMN search is determined to have been completed in step S3504, the process goes to step S3507, in which the 2G module performs a measurement activity for the neighboring cells of the qualified cell. Next, the 2G module performs a or the next 2G channel activity for the qualified cell(s) while performing the neighboring cell measurement activity for the qualified cell at the same time if feasible (Step S3508). The resulting time slots of the scheduled radio activities is shown in FIG. 36. Note also that after the 3G partial PLMN search is determined to have been completed in step S3504, the 2G module may directly perform a or the next 2G channel activity for the qualified cell(s) while performing the neighboring cell measurement activity for the qualified cell at the same time if feasible as shown in step S3508. The resulting timing diagram is shown in FIG. 37. Next, the arbiter or the 2G module determines whether the 2G partial PLMN search has been completed (Step S3509). When the 2G partial PLMN search has not been completed, the arbiter or the 2G module further determines whether the 2G neighboring cell measurement activity continues to remain unfinished (Step S3510). When the 2G neighboring cell measurement activity continues to remain unfinished, the 2G module performs the neighboring cell measurement activity for the remaining cells up until beginning of a next 2G channel activity (Step S3511). When the 2G neighboring cell measurement activity has been completed, or when a next 2G channel activity begins, the process returns to step S3508. On the other hand, when the 2G partial PLMN search is determined to have been completed in step S3509, the process goes to step S3512, in which the 3G module performs a cell reselection procedure for camping on a better cell. After the cell reselection of the 3G module has been completed, the 2G module may further perform a cell reselection procedure in step S3513 for camping on a better cell. According to the embodiment of the invention, time consumption for the 3G and 2G cell reselections may be reduced for the corresponding measurement results are obtained while performing the corresponding channel activities for the qualified cell(s). Details for each step may refer to description of FIGS. 33A and 33B.

Figure 38A:
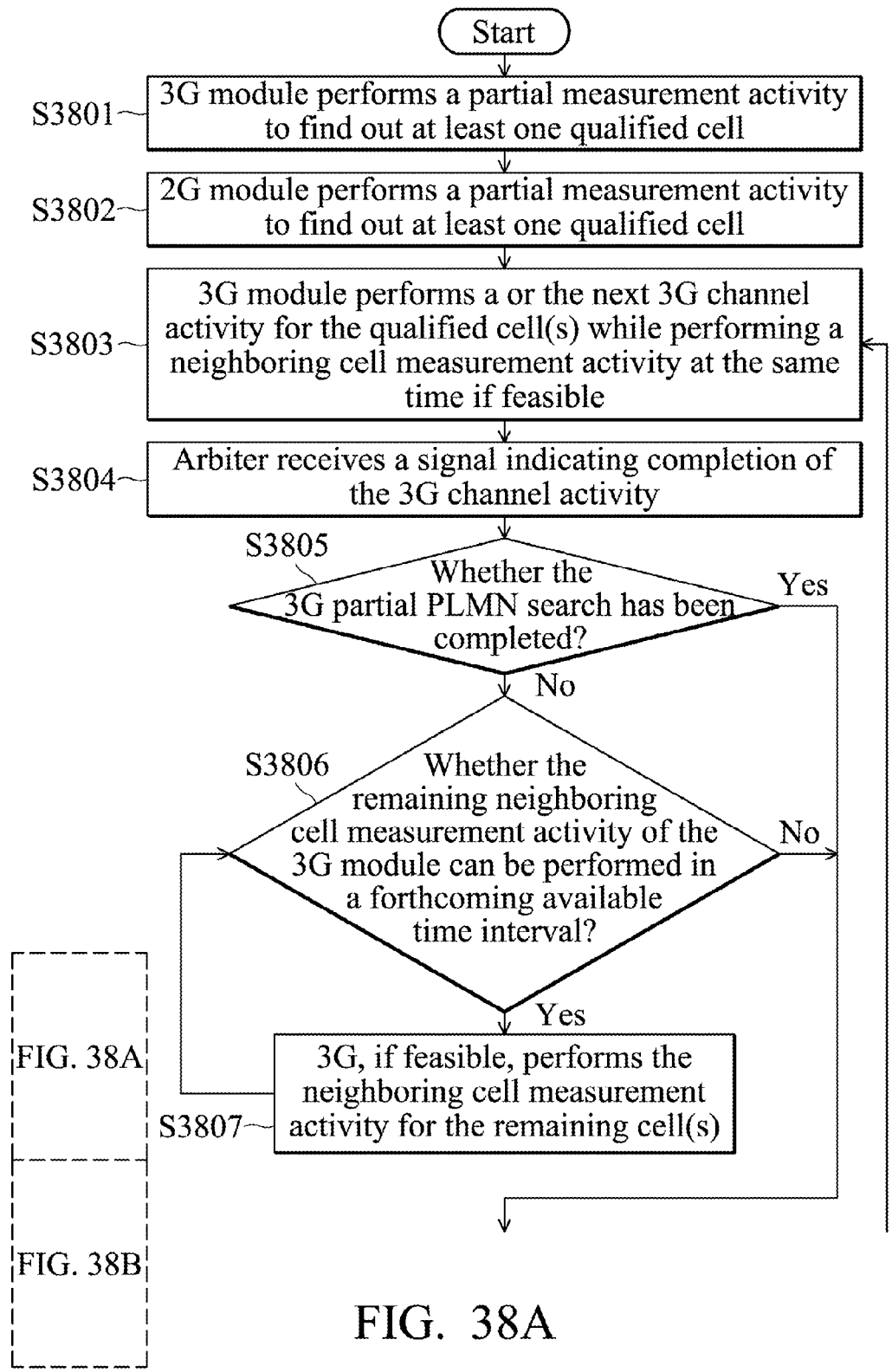
FIG. 38A and FIG. 38B are the flow charts showing a method for supporting partial PLMN searches in different RATs with coordinated radio activities by using a shared antenna according to still another embodiment of the invention.
Figure 38B:
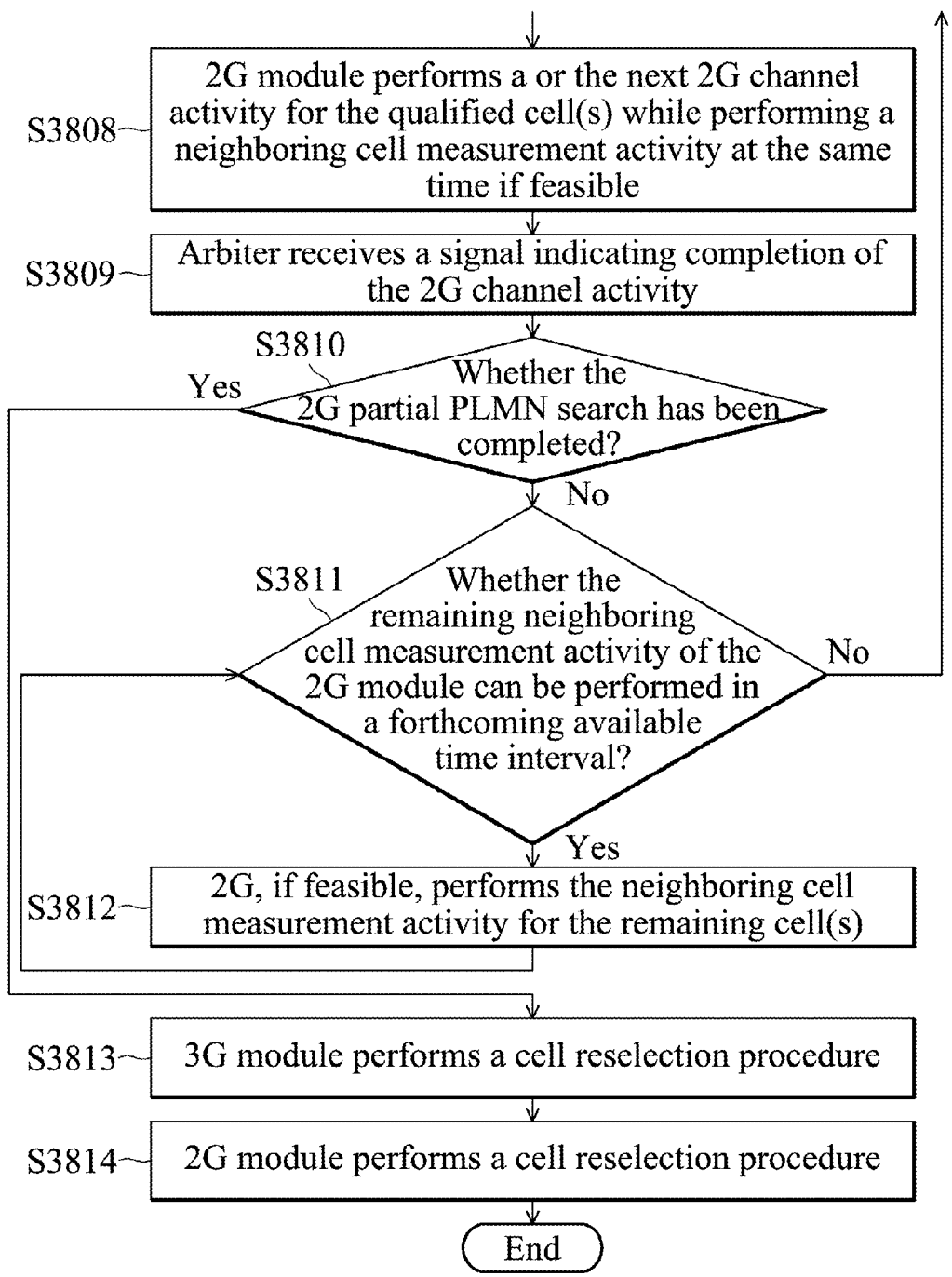
Figure 39:
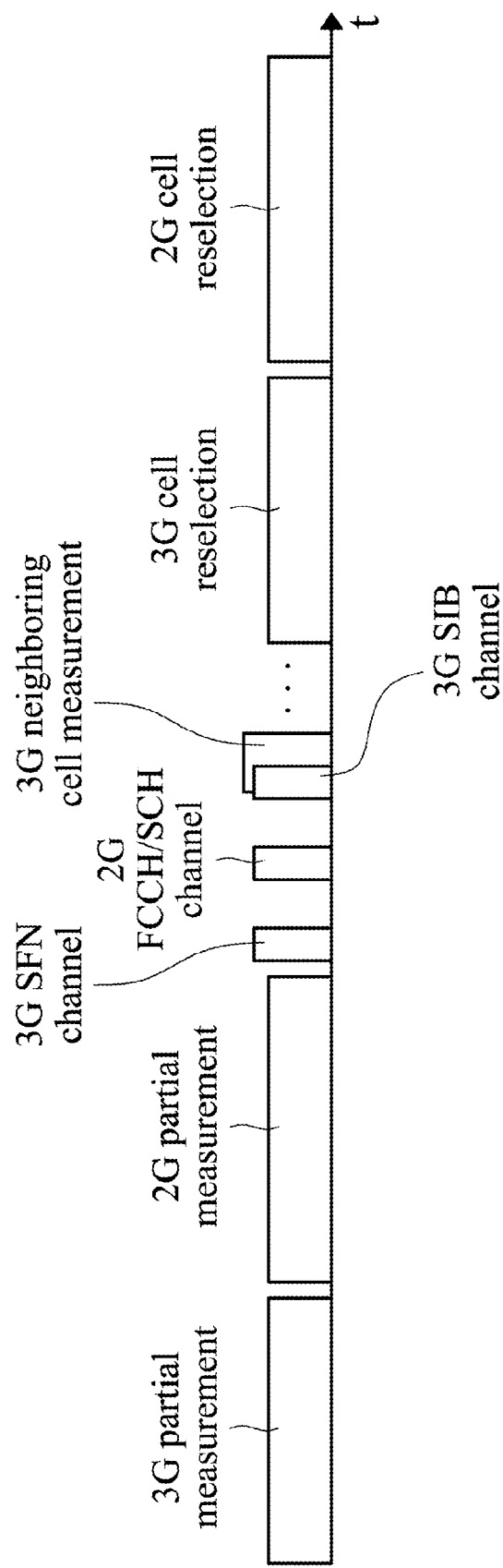
FIG. 39 is a timing diagram showing the coordinated measurement and channel activities in different RATs according to still yet another embodiment of the invention.

FIG. 38A and FIG. 33B are the flow charts showing a method for supporting partial PLMN searches in different RATs with coordinated radio activities by using a shared antenna according to still another embodiment of the invention. FIG. 39 is the resulting timing diagram based on the flow chart shown in FIG. 38A and FIG. 33B. In this embodiment, the 2G and 3G radio activities may be coordinated and arranged in a multiplexing manner by scheduling at least one of the 2G/3G radio activities, (either the channel activity or the neighboring cell measurement activity), between two successive 3G/2G radio activities as previously described. Note that as shown in the exemplary flow chart and timing diagram, the 3G partial PLMN search is initiated earlier than that of 2G module. However, it is easy for persons with ordinary skill in the art to deduce the flow chart and timing diagram for the 2G module initiating the 2G partial PLMN search first from FIG. 38A, FIG. 33B and FIG. 39. Therefore, the invention should not be limited thereto. To begin with, the 3G module performs a partial measurement activity to locate at least one qualified cell (Step S3801). Next, the 2G module performs a partial measurement activity to locate at least one qualified cell (Step S3802). Next, the 3G module performs a or the next 3G channel activity for the qualified cell(s) while performing a measurement activity for neighboring cells of the qualified cell at the same time if feasible (Step S3803). It is to be understood that the neighboring cells can be measured when the 3G module successfully obtains the neighboring cell list from broadcast system information blocks as described above. Note that the 3G channel activity may be listening to a SFN or SIB channel, or a location update via the DCH channel as mentioned above, and the resulting time slots of the scheduled radio activities is shown in FIG. 39. Note also that the partial measurement activity performed in step S3801 may be scanning a portion of cells in a cell list, for example, scanning ⅓ of the cells, or scanning a portion of cells up until a qualified cell is found, and the neighboring cell measurement activity performed in step S3803 may be scanning neighboring cells of the qualified cell if feasible. After the 3G channel activity has been completed, the arbiter may receive a signal indicating completion of the 3G channel activity (Step S3804). Next, the arbiter or the 3G module determines whether the 3G partial PLMN search has been completed (Step S3805). The partial PLMN may be determined to have been completed after camping on the qualified cell and performing location update as previously described. When the 3G partial PLMN search has not been completed, the arbiter or the 3G module further determines whether the remaining neighboring cell measurement activity of the 3G module can be performed in a forthcoming available time interval (Step S3806). The methods for obtaining the available time interval up until a forthcoming 2G channel activity have been described in detail in previous paragraphs and are omitted here for brevity. When the remaining neighboring cell measurement activity of the 3G module can be performed in a forthcoming available time interval, the 3G performs the remaining neighboring cell measurement activity for the remaining cell (Step S3807). When the remaining neighboring cell measurement activity of the 3G module cannot be performed in a forthcoming available time interval, for example, when the available time interval is not long enough for performing the remaining neighboring cell measurement activity, or no neighboring cell list has been received, the right of using the shared antenna may be switched to the 2G module.

After the right of using the shared antenna is switched to the 2G module, the 2G module performs a or the next 2G channel activity for the qualified cell(s) while performing a measurement activity for the neighboring cells of the qualified cell at the same time if feasible (Step S3808). It is to be understood that the neighboring cells can be measured when the 2G module successfully obtains the neighboring cell list from broadcast system information as described above. Note that the 2G channel activity may be listening to a FCCH, SCH or BCCH channel, or a location update via the TCH channel as mentioned above, and the resulting time slots of the scheduled radio activities is shown in FIG. 36. After the 2G channel activity has been completed, the arbiter may receive a signal indicating completion of the 2G channel activity (Step S3809). Next, the arbiter or the 2G module determines whether the 2G partial PLMN search has been completed (Step S3810). The partial PLMN may be determined to have been completed after camping on the qualified cell and performing location update as previously described. When the 2G partial PLMN search has not been completed, the arbiter or the 2G module further determines whether the remaining neighboring cell measurement activity of the 2G module can be performed in a forthcoming available time interval (Step S3811). When the remaining neighboring cell measurement activity of the 2G module can be performed in a forthcoming available time interval, the 2G performs the neighboring cell measurement activity for the remaining cell (Step S3812). When the remaining partial measurement activity of the 2G module cannot be performed in a forthcoming available time interval, for example, when the available time interval is not long enough for performing the remaining partial measurement activity, or no neighboring cell list has been received, the right of using the shared antenna may be switched back to the 3G module and the process returns to step S3803 for the 3G module to perform a or the next 3G channel activity for the qualified cell(s) while performing the remaining neighboring cell measurement activity at the same time if feasible. On the other hand, when the 2G partial PLMN search is determined to have been completed in step S3810, the 3G module, if required, performs a cell reselection procedure (Step S3813) to camp on a better cell according to the neighboring cell measurement results obtained while performing the channel activities for the previously obtained qualified cell(s). After the cell reselection of the 3G module has been completed, the 2G module, if required, may further perform a cell reselection procedure in step S3814 to camp on a better cell according to the neighboring cell measurement results obtained while performing the channel activities for the previously obtained qualified cell(s). According to the embodiment of the invention, since the neighboring cell measurement results respectively obtained while performing the corresponding channel activities for the qualified cell(s), the time required for the forthcoming cell reselections can be reduced.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An apparatus for coordinating radio activities in different radio access technologies (RATs), comprising:
   a first RAT module, performing a first channel activity, related to a first RAT, for transmitting or receiving information to or from a first cellular network by using an antenna, and requesting that a measurement activity, related to the first RAT, is to be performed for measuring signal power of a serving cell and/or at least one neighbor cell in the first cellular network by using the antenna;
   a second RAT module, requesting that a second channel activity, related to a second RAT, is to be performed for transmitting or receiving information to or from a second cellular network by using the antenna; and
   an arbiter, scheduling performance of the measurement activity between the first and second channel activities, wherein the scheduling comprising: calculating a time offset between the first and second channel activities based on timing parameters of the channel activities received from the first and second RAT modules; scheduling at least a portion of the measurement activity with duration that is less than the time offset; scheduling the remaining, if any, of the measurement activity after a forth coming channel activity is completed;
   wherein the first channel activity has to be performed at a specific time synchronized with the first cellular network and the second channel activity has to be performed at a specific time synchronized with the second cellular network.

2. The apparatus as claimed in claim 1, wherein the first RAT module suspends the measurement activity before beginning of the second channel activity.

3. The apparatus as claimed in claim 1, wherein the first RAT module further requests that a forthcoming first channel activity is to be performed, and the arbiter further schedules the measurement activity to be resumed after completion of the forthcoming first channel activity.

4. The apparatus as claimed in claim 1, wherein the second RAT module further requests that a forthcoming measurement activity is to be performed, and the arbiter further schedules the forthcoming measurement activity of the second RAT module to be performed right after completion of the measurement activity of the first RAT module.

5. The apparatus as claimed in claim 1, wherein the second RAT module further requests that a forthcoming measurement activity is to be performed, and the arbiter immediately schedules the forthcoming measurement activity when there is no other requested channel activities or suspended measurement activities have to be performed.

6. A method for coordinating radio activities in different radio access technologies (RATs), comprising:
  performing, by the first RAT module, a first channel activity, related to a first RAT, for transmitting or receiving information to or from a first cellular network;
  arranging, by the second RAT module, a second channel activity, related to a second RAT, to be performed for transmitting or receiving information to or from a second cellular network; and
  performing, by the first RAT module, a measurement activity, related to the first RAT, for measuring signal power of a serving cell and/or at least one neighbor cell in the first cellular network between the first and second channel activities,
  calculating a time offset between the first and second channel activities based on timing parameters of the channel activities received from the first and second RAT modules;
  scheduling at least a portion of the measurement activity with duration that is less than the time offset; scheduling the remaining, if any, of the measurement activity after a forth coming channel activity is completed;
  wherein the first and second RAT modules share a single antenna to perform the first and second channel activities and the measurement activity, and
  wherein the first channel activity has to be performed at a specific time synchronized with the first cellular network and the second channel activity has to be performed at a specific time synchronized with the second cellular network.

* * * * *